(12) United States Patent
Futral et al.

(10) Patent No.: US 7,363,393 B2
(45) Date of Patent: Apr. 22, 2008

(54) CHIPSET FEATURE DETECTION AND CONFIGURATION BY AN I/O DEVICE

(75) Inventors: William T. Futral, Portland, OR (US); Kenneth C. Creta, Gig Harbor, WA (US); Sujoy Sen, Portland, OR (US); Gregory D. Cummings, Portland, OR (US); Sivakumar Radhakrishnan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 10/750,060

(22) Filed: Dec. 30, 2003

(65) Prior Publication Data

US 2006/0136611 A1 Jun. 22, 2006

(51) Int. Cl.
*G06F 3/00* (2006.01)
(52) U.S. Cl. ............... 710/8; 710/1; 710/15; 710/16
(58) Field of Classification Search ............... None
See application file for complete search history.

(56) References Cited

U.S. PATENT DOCUMENTS 5,884,027 A    3/1999 Garbus et al.
2002/0016877 A1    2/2002 Porterfield
2003/0182482 A1    9/2003 Creta et al.
2003/0217311 A1    11/2003 Smith
2005/0071531 A1*   3/2005 Oshins ................... 710/260

OTHER PUBLICATIONS

Notification Of Transittal Of The International Search Report And The Written Opinion Of The International Searching Authority, Or The Declaration for PCT/US2004/043676 mailed May 27, 2005, 11 pages.

* cited by examiner

*Primary Examiner*—Alford Kindred
*Assistant Examiner*—Richard Franklin
(74) *Attorney, Agent, or Firm*—Blakely, Sokoloff, Taylor & Zafman LLP

(57) ABSTRACT

Apparatus and method for a first device to query a second device for the availability of a hardware feature within the second device, and for the second to receive and analyze the query to determine whether or not to respond, depending on the version of hardware feature sought, a code identifying a vendor, etc., and responding with a reply providing an indication of availability of the hardware feature and/or an address at which the hardware feature may be accessed, if the determination is made to reply.

28 Claims, 15 Drawing Sheets

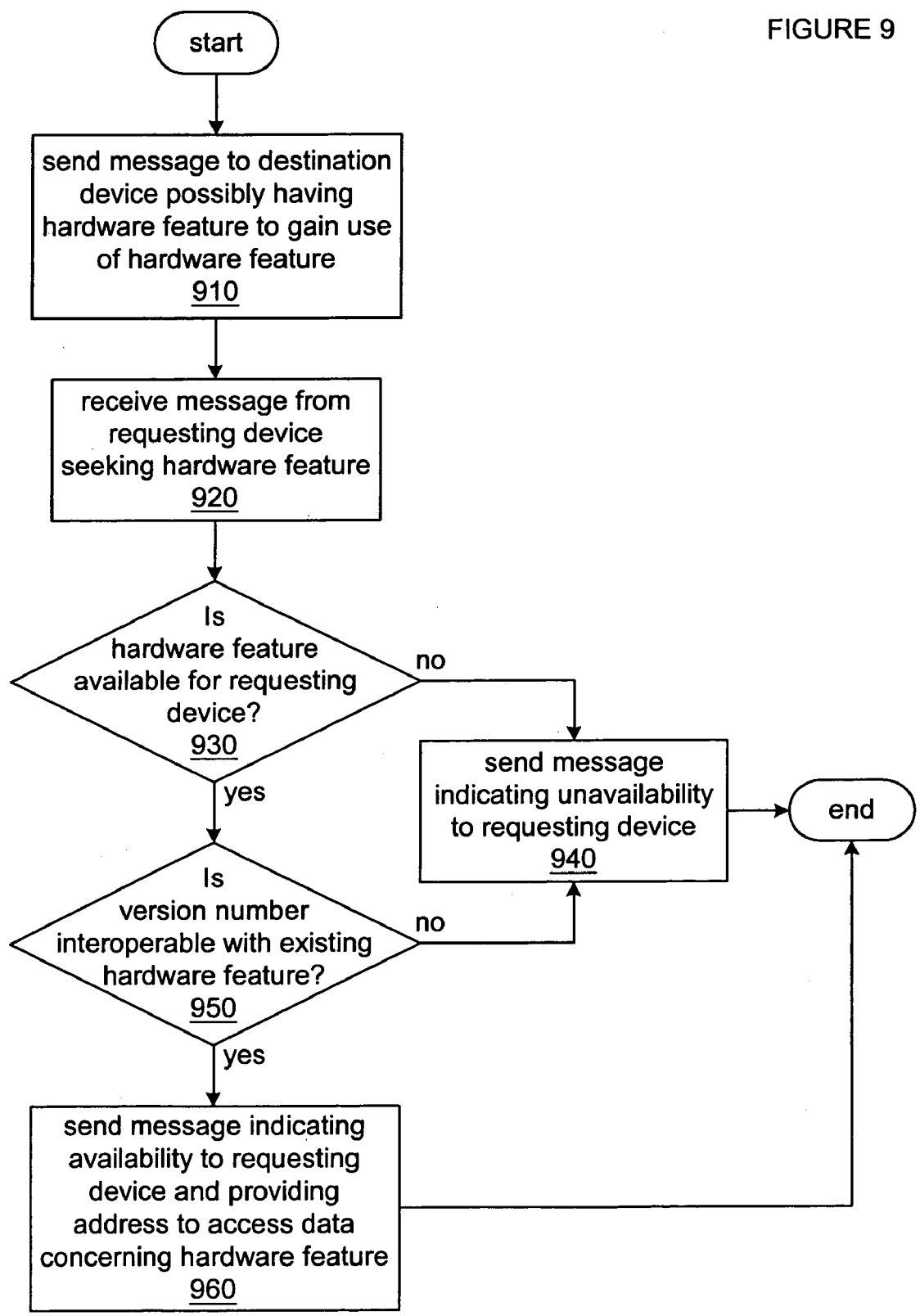

CHIPSET FEATURE DETECTION AND CONFIGURATION BY AN I/O DEVICE

BACKGROUND

Various computer system architectures have employed a number of approaches to configuring interactions between devices within a computer system, especially the interaction between an I/O device and core logic within a chipset supporting a processor. Approaches have included the use of firmware (software stored in nonvolatile memory devices) that is executed by a processor to carry out various functions to detect and configure features of a chipset and/or a bus between a chipset and an I/O device. Approaches have also included the provision of device drivers to be executed by a processor as part of executing the code making up an operating system to also detect and/or configure features of a chipset and/or the interaction of those features and a given I/O device.

Various drawbacks arise in these various approaches from the reliance on software, whether within firmware that is executed as a computer system is first powered on or reset, or within device driver software accompanying an operating system. Whenever software is used to detect and/or configure features of any piece of hardware, the selection of software must be paired with and match the selection of hardware, which can be cumbersome and confusing to end users, especially in the case of device drivers, as typical end users of a computer system have very little understanding of what pieces of hardware make up the computer systems they use, let alone what software should accompany those pieces. This dilemma is somewhat ameliorated for end users by the provision of software to detect and/or configure hardware features within the firmware of a computer system, since the firmware is typically matched by the builder of the computer system to the parts making up that computer system. However, once this match has been established between hardware and software, and the software has been stored in the firmware, it can be cumbersome to make changes to that firmware (often more cumbersome than is the case of device drivers) to accommodate the addition of newer pieces of hardware. Often, special utilities are required to "flash" or "burn" a new variant of firmware into nonvolatile storage, and due to the common requirement that such utilities be employed without the benefit of an operating system that could provide various facilities to make the use of a utility easier for end users, this task of changing the firmware can be even more difficult for an end user. The difficulty of dealing with either the flashing/burning of firmware or the changing of operating system device drivers has been addressed, to some degree, by the provision of "option ROM" firmware stored in additional nonvolatile memory devices accompanying new hardware added to a computer system. However, this approach requires this accompaniment of the new hardware by a nonvolatile memory device, and depending on the nature of the hardware added, this may not always be possible.

A further drawback in relying on software, no matter how it is provided, is that a fully initialized processor and memory are required to execute software, and there may be configurations of electronic devices (including computer systems or portions of computer systems) in which a processor and/or memory are unavailable, either altogether, or at least for a period of time following the powering on or resetting of that electronic device. Still, it may be desirable to be able to proceed with detecting and/or configuring hardware features despite the unavailability of either a processor or memory.

BRIEF DESCRIPTION OF THE DRAWINGS

The objects, features, and advantages of the present invention will be apparent to one skilled in the art in view of the following detailed description in which:

FIG. 9 is a flow chart of still another embodiment.

DETAILED DESCRIPTION

In the following description, for purposes of explanation, numerous details are set forth in order to provide a thorough understanding of the present invention. However, it will be apparent to one skilled in the art that these specific details are not required in order to practice the present invention as hereinafter claimed.

The present invention as hereinafter claimed concerns incorporating support for components of an electronic system to make and answer inquiries concerning the availability of one or more hardware features provided to enhance functionality, and support for some degree of arbitration and/or configuration of such hardware features, if present. Although the following discussion makes recurring mention of DMA controllers as a hardware feature, this choice of hardware feature is intended to be but an example of one possible hardware feature about which inquiry, arbitration and/or configuration takes place, with other hardware features in addition to or in place of a DMA controller being possible. Furthermore, although the following discussion centers on computer systems, it will be understood by those skilled in the art that the present invention as hereinafter claimed may be practiced in support of other forms of electronic system.

Figure 1:
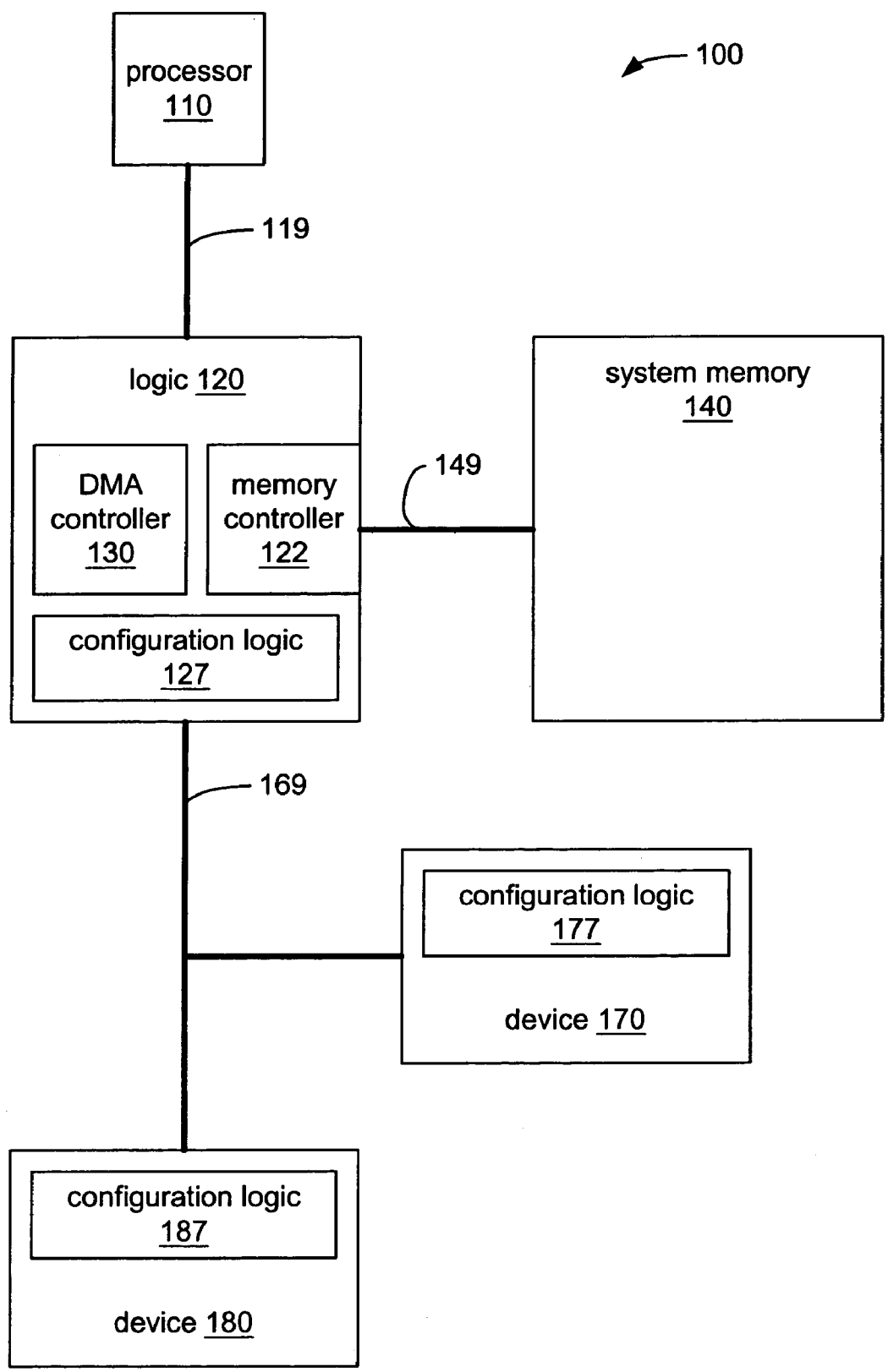
FIG. 1 is a block diagram of embodiments employing a computer system.

FIG. 1 is a block diagram of embodiments employing a computer system. Computer system 100 is, at least in part, made up of processor 110, bus 119, logic 120, bus 149, and system memory 140. Processor 110, bus 119, logic 120, bus 149 and system memory 140 make up a form of core of computer system 100 capable of executing machine readable instructions that may be stored within system memory 140 and/or within other devices of computer system 100. However, as those skilled in the art will readily recognize, this is but one example of many possible forms of core of computer system 100, and that computer system 100 may also be further made up of other buses and devices not shown.

In various embodiments, processor 110 could be any of a variety of types of processor including a processor capable of executing at least a portion of the widely known and used "x86" instruction set originated by Intel Corporation, a corporation of Santa Clara, Calif. Also, in various possible embodiments, there could be more than one processor along with additional buses and/or devices to provide support for more than one processor (not shown).

Logic 120 is coupled to processor 110 via bus 119, and performs various functions in support of the execution of instructions by processor 110, including controlling and providing processor 110 with access to system memory 140 to which logic 120 is further coupled via bus 149. Logic 120 also provides access to other devices making up computer system 100 to which logic 120 is coupled via bus 169. In being coupled to buses 119, 149 and 169, and providing processor 110 with access to system memory 140 and other devices via bus 169, logic 120 serves as what is commonly referred to as a "bridge" between these buses. In serving as a bridge, logic 120 also provides computer system 100 with memory controller 122 to aid in carrying out transactions on bus 149, and configuration logic 127 to aid in configuring various hardware features within logic 120 for use during normal operation of computer system 100, including aiding in the carrying out of transactions across buses 119 and/or 169. To relieve processor 110 of some of the burden of carrying out some transfers of blocks of data, an example hardware feature of logic 120 may, in some embodiments, be DMA controller 130.

In various embodiments, system memory 140 could be any of a variety of types of random access memory (RAM) including fast page mode (FPM), extended data out (EDO), single data rate (SDR) or double data rate (DDR) forms of synchronous dynamic RAM (SDRAM), or RAM employing the RAMBUS™ interface or other interfaces. Memory controller 122 and bus 149 are configured to support the timing and/or protocol requirements of one or more types of memory and/or memory interfaces.

As is also depicted in FIG. 1, bus 169 couples logic 120 to devices 170 and 180. Devices 170 and 180 may be any of a wide variety of types of devices, including disk controllers, parallel or serial interface ports using any of a number of protocols to communicate with devices external to computer system 100, graphics controllers, interfaces for the connection of removable solid state media, bridge devices, testing devices, etc. Not unlike logic 120, devices 170 and 180 have configuration logic 177 and 187, respectively, to aid in configuring various hardware features within devices 170 and 180.

At a time when computer system 100 is initialized, perhaps as a result of computer system 100 being powered on, or perhaps as a result of computer system 100 being "reset" as by a user of computer system pressing a reset button or causing a rebooting of computer system 100 through various possible forms of software, processor 110 may execute a series of instructions (software) stored within system memory 140 (or elsewhere) causing processor 110 to access one or more of configuration logic 127, 177 and/or 187 to configure one or more of logic 120, device 170 and/or device 180 for use. During such accesses to one or more of configuration logic 127, 177 and/or 187, various configuration registers may be programmed with values enabling various hardware features, assigning address ranges for ports and buffers, assigning bus ID and device ID numbers, etc. In some embodiments, this programming of registers with address ranges, etc., may provide each of configuration logic 127, 177 and 187 with information needed to form unique ID values for each of logic 120, device 170 and device 180. In other embodiments, this programming of registers may also be a prerequisite to each of logic device 120, device 170 and device 180 being permitted to interact with bus 169 and/or other buses beyond interactions to allow for accesses by processor 110 to configuration logics 127, 177 and/or 187.

Following such accesses made by processor 110 to configuration logics 127, 177 and 187, configuration logic 177 of device 170 attempts to access configuration logic 127 to detect and configure a hardware feature of logic 120, perhaps DMA controller 130, for use with device 170. In making such an attempted access, configuration logic 177 is testing to confirm that device 170 is actually connected to logic 120, possibly because logic 120 and device 170 are provided for the construction of computer system 100 by the same vendor, and therefore, device 170 attempts this access to logic 120 to determine if logic 120 is present and attached to device 170 as part of determining whether or not a specific hardware feature that may be unique to logic 120 is available for use with device 170. In such embodiments, if it is determined that device 170 is not coupled via bus 169 to logic 120 (i.e., if device 120 in FIG. 1 were substituted with some other device), then in some variations, configuration logic 177 may configure at least a portion of device 170 to function without the benefit of the desired hardware feature of logic 120, or in other variations where it is not possible to operate some portion of device 170 without the desired hardware feature of logic 120, configuration logic 177 may disable at least a portion of device 170. By way of example, if the functionality of device 170 would be improved by interaction between device 170 and DMA controller 130 within logic 120 to assist in the transfer of blocks of data, then configuration logic 177 attempts an access to configuration logic 127 to determine that logic 120 is coupled to device 170 and/or that DMA controller 130 is present and available for use with device 170.

In attempting to access configuration logic 127, configuration logic 177 may transmit a value identifying the vendor of device 170 and/or an identifier of the device 170, itself. Configuration logic 177 may also transmit one or more pieces of data programmed into one or more configuration registers within configuration logic 177, perhaps an identifying number given to device 170 and/or to bus 169 by which device 170 is accessed. Configuration logic 127 may examine one or more values sent by configuration logic 177 in the attempted access to identify the device making the attempted access and/or the ID of the vendor of the device making the attempted access to determine whether or not the attempted access by configuration logic 177 is a transaction to which configuration logic 127 ought to respond and/or to determine how configuration logic 127 ought to respond. It may be that if a value sent by configuration logic 177 that identifies, for example, the vendor of device 170 does not identify a vendor to which configuration logic 127 should respond, then configuration logic 177 may simply ignore the attempted access just as if configuration logic 177 were not present. Alternatively, configuration logic 127 may respond to such a mismatch in identifying values by signaling an error, perhaps using a protocol provided by bus 169 for indicating that an error has occurred. If, however, configuration logic 177 has conveyed a value that provides an identification of some form that configuration logic 127 determines should be accepted, then configuration logic 127 may respond with an address providing a pointer to a location where more information may be provided to logic 177 concerning the sought after hardware feature, and/or providing a location at which registers and/or a buffer may be found through which device 170 may begin interacting with the sought after hardware feature within logic 120. In embodiments where more than one device (for example, devices 170 and 180) may seek to make use of the same hardware feature within logic 120, a form of arbitration between which of multiple devices is to be granted usage of the sought after hardware feature may be based on which of those multiple devices is the first to make the attempt at accessing configuration logic 127. In such an embodiment, it may be that only the first device to make such an attempted access is responded to by configuration logic 127 in such a way that indicates success in gaining the use of the sought after hardware feature, with all other devices not being responded to, at all. Alternatively, in such an embodiment, it may be that all such attempted accesses by all devices seeking to make use of the sought after hardware feature are responded to, but only one of those responses includes an indication of success in being granted use of the hardware feature. Either way, a register within configuration logic 127 and/or a memory location within system memory 140 that is readable by a device coupled to bus 169 may provide a bit that initially indicates that the hardware feature is available to whichever device reads the register or memory location first, but then that bit is set to a different value so that all subsequent reads of that register or memory location (presumably by devices other than the one to which the hardware feature was made available) will indicate that the hardware feature is unavailable, i.e., what has been called a "read-to-set" bit in a register or memory location as a simple form of arbitration.

Further details of possible forms of response that may be given to a device seeking a given hardware feature from another device will be discussed, later, along with further details of possible forms of arbitration between devices for access to a given hardware feature. Regarding an attempted access being made to configuration logic 127, different types of attempted accesses are possible, such as either an attempted read or write transaction, or an attempted message transmission.

In some embodiments, configuration logic 177 makes an attempt to access configuration logic 127 by attempting a read transaction across bus 169, perhaps to a predetermined address location within configuration logic 127. Configuration logic 177 may check for an indication that the read transaction was successful (if bus 169 supports the provision of feedback indicating the success or failure of an attempted transaction), i.e., that configuration logic 127 was successfully accessed and/or that the attempted read transaction was accepted (or at least, not rejected). A lack of success in accessing configuration logic 127 may indicate that logic 120 is not the device that device 170 was attempting to find (i.e., configuration logic 127 may not even be present), or that logic 120 does not have the hardware feature that device 170 was attempting to find, or possibly, that the hardware feature that device 170 was attempting to find within logic 120 is present within logic 120, but is not available for use by device 170 (perhaps, the hardware feature has already been reserved for use by another device, such as device 180). Success in accessing configuration logic 127 such that configuration logic 127 responds to the attempted read transaction by providing data may, by itself, be taken as an indication to configuration logic 177 in some embodiments, that device 170 is indeed connected to logic 120, and that the hardware feature sought by configuration logic 127 is present within logic 120 and is available for use by device 170. Alternatively, the successful provision of data by configuration logic 127 may provide little more than confirmation that configuration logic 127 is present and, configuration logic 177 may analyze the returned data to determine characteristics about logic 120, possibly including the vendor of logic 120, whether logic 120 provides the hardware feature being sought by configuration logic 177, and/or aspects of the sought after hardware feature required to allow device 170 to interact with that hardware feature.

In other embodiments, configuration logic 177 makes an attempt to access configuration logic 127 by attempting a write transaction across bus 169, again, perhaps to a predetermined address location within configuration logic 127. Again, configuration logic 177 may check for an indication that the write transaction was successful, i.e., that configuration logic 127 was successfully accessed and/or that the attempted write transaction was accepted (or at least, not rejected). A lack of success in accessing configuration logic 127 may indicate that logic 120 is not the device that device 170 was attempting to find (i.e., configuration logic 127 may not even be present), or that logic 120 does not have the hardware feature that device 170 was attempting to find, or possibly, that the hardware feature that device 170 was attempting to find within logic 120 is present within logic 120, but is not available for use by device 170 (perhaps, the hardware feature has already been reserved for use by another device, such as device 180). Success in accessing configuration logic 127 such that configuration logic 127 accepts the attempted read transaction may, by itself, be taken as an indication to configuration logic 177 in some embodiments, that device 170 is indeed connected to logic 120, and that the hardware feature sought by configuration logic 127 is present within logic 120 and is available for use by device 170. It may also be that the attempted write operation communicated a data value to configuration logic 127 that indicates to configuration logic 127 (somewhat like a key or signature value) that there is a device coupled to logic 120 (namely, device 170) that is attempting to coordinate the use of a hardware feature within logic 120. It may be that just the successful acceptance of the attempted write operation is not sufficient to indicate to configuration logic 177 that the desired hardware feature has been found and/or is available for use with device 170, and in such embodiments, logic 177 may await the provision of data by configuration logic 127 that provides confirmation of these things, either through a write operation by configuration logic 127 back to configuration logic 177 in response, or through a data value returned by configuration logic 127 in a read transaction that configuration logic 177 carries out following the attempted write transaction.

In still other embodiments, configuration logic 177 makes an attempt to access configuration logic 127 by attempting to transmit a message across bus 169 where bus 169 supports the transmission of messages between devices. Configuration logic 177 may check for an indication that the message transmission was successful (if bus 169 supports the provision of an indication that the attempted transmission of a message was successful), i.e., that configuration logic 127 did not reject the message, at least. A lack of success in transmitting the message to configuration logic 127 may indicate that logic 120 is not the device that device 170 was attempting to find (i.e., configuration logic 127 may not even be present), or that logic 120 does not have the hardware feature that device 170 was attempting to find, or possibly, that the hardware feature that device 170 was attempting to find within logic 120 is present within logic 120, but is not available for use by device 170 (perhaps, the hardware feature has already been reserved for use by another device, such as device 180). In embodiments where it is possible to determine the success of transmitting a message, success in transmitting a message may, by itself, be taken as an indication to configuration logic 177 in some embodiments, that device 170 is indeed connected to logic 120, and that the hardware feature sought by configuration logic 127 is present within logic 120 and is available for use by device 170. It may also be that the attempted transmission of the message to configuration logic 127 either is an indication, or conveyed an indication, to configuration logic 127 that there is a device coupled to logic 120 (namely, device 170) that is attempting to coordinate the use of a hardware feature within logic 120. It may be that just the successful acceptance of the transmitted message is not sufficient to indicate to configuration logic 177 that the desired hardware feature has been found and/or is available for use with device 170, and in such embodiments, logic 177 may await the provision of data by configuration logic 127 that provides confirmation of these things, possibly via the transmission of a message by configuration logic 127 back to configuration logic 177.

Figure 2:
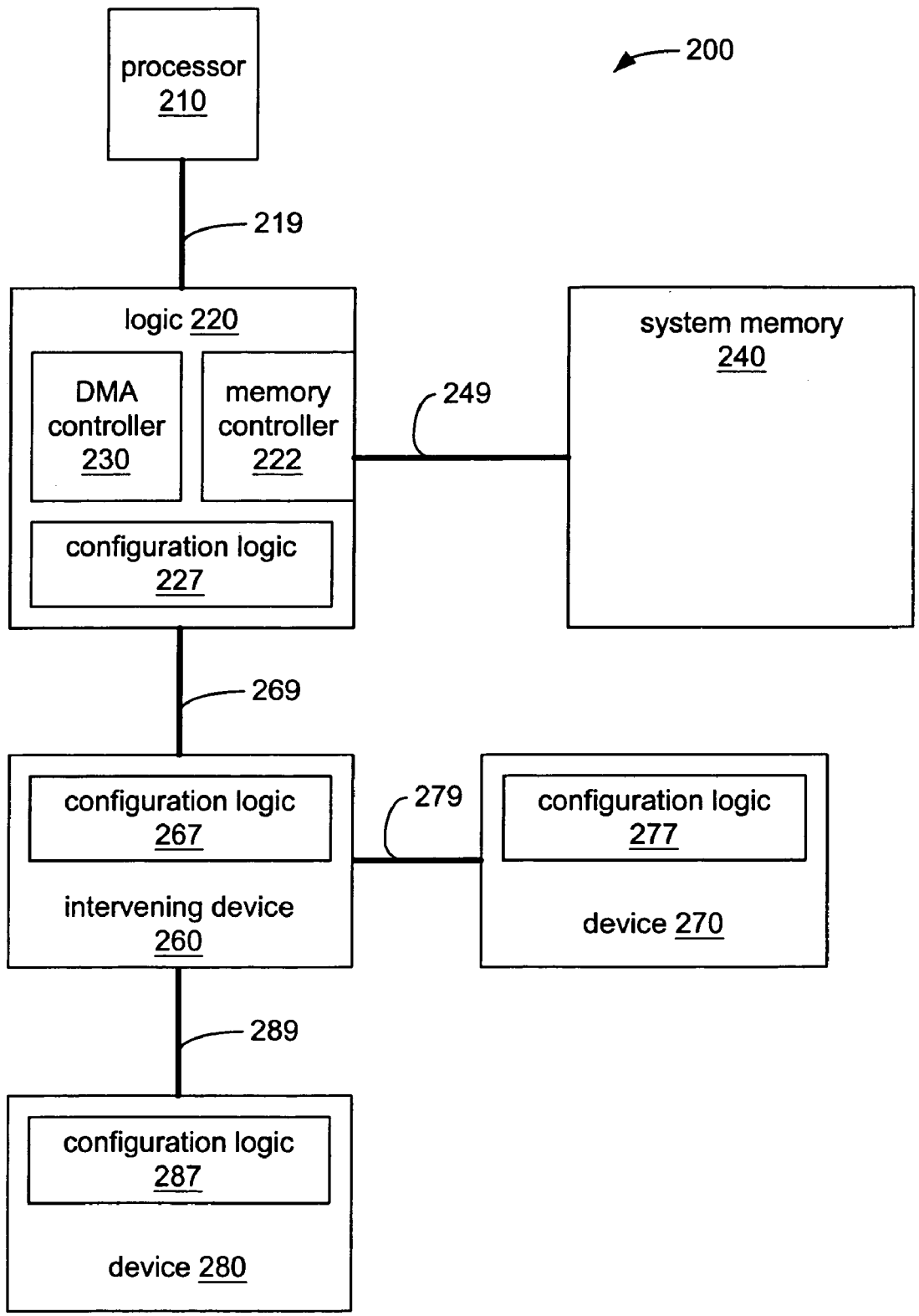
FIG. 2 is another block diagram of other embodiments employing a computer system.

FIG. 2 is another block diagram of embodiments employing a computer system. The numbered items in FIG. 2 are meant to generally correspond to the number items in FIG. 1, and in a manner not unlike computer system 100 of FIG. 1, computer system 200 is, at least in part, made up of processor 210, bus 219, logic 220, bus 249, and system memory 240. As was the case with computer system 100, those skilled in the art will readily recognize that this is but one example of many possible forms of core of computer system 200, and that computer system 200 may also be further made up of other buses and devices not shown.

Like logic 120 of FIG. 1, logic 220 is coupled to processor 210, system memory 240 and other possible devices via buses 219, 249 and 269, respectively, and performs various functions in support of execution of instructions by processor 210, including controlling and providing processor 210 with access to system memory 240 and serving as a bridge. Furthermore, to relieve processor 210 of some of the burden of carrying out some transfers of blocks of data, an example hardware feature of logic 220 may, in some embodiments, be DMA controller 230

Somewhat like embodiments discussed with reference to computer system 100 of FIG. 1, in computer system 200, bus 269 couples logic 220 to devices 270 and 280. However, unlike computer system 100, devices 270 and 280 are coupled to logic 220 through buses 279 and 289, respectively, and then through intervening device 260 and bus 269, instead of through bus 269, directly. The use of bus 169 in computer system 100 to couple together all three of logic 120, device 170 and device 180 illustrated an example of a "multi-drop" bus configuration in which signals of bus 169 were coupled to more than two devices, as is common practice in the case of many widely used forms of bus. The use of intervening device 260 such that three different buses effectively take the place of a single bus may be implemented where buses 269, 279 and 289 are meant to be point-to-point buses, though there may be other motivations for such a change, including a need to convert between types of buses and/or bus protocols between two or more of buses 269, 279 and 289. In embodiments where one or more of buses 269, 279 and 289 are indeed point-to-point buses, various forms of differential signaling and/or serial transmission of addresses and/or data may occur, depending on the characteristics of each of these particular buses. Also, in embodiments where one or more of buses 269, 279 and 289, the provision of intervening device 260 may be required to serve the function of being a "switch" to concentrate multiple point-to-point buses into a single point-to-point bus interfacing with logic 220. Also, devices 269, 279 and 289 may be any of a wide variety of types of devices.

Also somewhat like logic 120, device 170 and device 180 of computer system 100, logic 220, intervening device 260, device 270 and device 280 of computer system 200 provide configuration logics 227, 267, 277 and 287, respectively, to permit enabling of functionality and/or configuration via processor 210 executing software at a time when computer system 200 is powered on and/or reset. Again, in various embodiments, the accessing of configuration logics 227, 267, 277 and/or 287 may be a prerequisite to allowing one or more of logic 220, intervening device 260, device 270 and device 280 to interact with buses 269, 279 and/or 289 more fully than may be needed to carry out configuration.

Again, somewhat like computer system 100, in computer system 200, after accesses made by processor 210 to each of configuration logics 227, 267, 277 and/or 287 to carry out configuration functions, configuration logic 277 of device 270 attempts to access configuration logic 227 to detect and configure a hardware feature of logic 220, perhaps DMA controller 230, for use with device 270. However, the presence of intervening device 260 and bus 279 between device 270 and both bus 269 and logic 220 may, in various possible embodiments, bring about some differences in how configuration logic 277 within device 270 attempts to access configuration logic 227 within logic 220. For configuration logic 277 to attempt an access of configuration logic 227, the attempted access must incorporate some form of indication to configuration logic 267 or some other portion of intervening device 260 that the attempted access is not meant to be answered or responded to by configuration logic 267, and that the attempted access should, in some way, be passed on to configuration logic 227 within logic 220. FIG. 1 depicted a situation in which such an indication may not have been necessary. In some embodiments, such an indication could be an address embedded within the protocol of the access that could be determined to not exist within intervening device 260, thereby causing the attempted access to be relayed onward to logic 220. In other embodiments, such an indication may be in the form of a value identifying the access as being meant for receipt by a specific device, namely logic 220. Still other mechanisms for directing an attempted access to one device through another may be employed without departing from the spirit and scope of the claimed invention, as those skilled in the art will readily recognize.

FIGS. 3a, 3b, 3c, 3d and 3e depict an embodiment employing an attempted message transaction and possible response. As previously discussed, in some embodiments, a device seeking to detect and/or configure a given hardware feature in another device may seek that given hardware feature by attempting to access a portion of the logic of that other device through the attempted transmission of a message to the other device across a bus that supports the transmission of messages. FIGS. 3a-d, together, depict features of a possible organization of bits of information conveyed in at least the header portion of a packetized message that a device seeking to detect and/or configure a given hardware feature would attempt to send, and FIGS. 3a-c and 3e, together, depict similar features of a packetized message that may be sent by the other device in response to the attempted message. In both cases, the depicted organization of bits is intended to be operable with a bus architecture employing multiple point-to-point buses organized in a branching tree-like configuration across which addresses, commands, data and other information are transferred in packetized form across digital serial connections. Although the specific allocation of bits of information need not conform to any one standard or convention to be within the spirit and scope of the claimed invention, an arrangement of bits of information is depicted that is intended to be in compliance with the requirements of the currently emerging PCI-Express bus specification (the specification for which may currently be ordered from the Peripheral Component Interconnect Special Interest Group, of Portland, Oreg.).

Doublewords 310, 320, 330 and 340*a* make up at least the first four doublewords (blocks of four bytes) of a packetized message that a device seeking a given hardware feature (i.e., the "requesting device") may attempt to transmit in an effort to test another device in which the given hardware feature may be present (i.e., the "destination device"). Similarly, doublewords 310, 320, 330 and 340*b* make up at least the first four doublewords of a packetized message that the other device may transmit in response. For sake of clarity in the discussion that follows, it should be noted that the term "requesting device" is meant to denote the device transmitting the message and "destination device" is meant to denote the device to which the message is being directed. Therefore, if the attempted message by one device succeeds in eliciting another message in response from the other device, the designations of "requesting device" and "destination device" will actually change between the attempted transmission and the possible response transmission.

Doubleword 310 is the first of the four doublewords to be transmitted, followed in turn by doublewords 320, 330 and either 340*a* or 340*b*. Within byte 0 is an indication of whether the format of the message is such that additional doublewords are appended to the header of four doublewords to make space for conveying more data, or not (if not, then the header of four doublewords may become the entire message). However, as will be seen, shortly, doubleword 340*a* or 340*b* may be able to provide all of the space needed to convey such information without the appending any additional doublewords. Also within byte 0 is an indication of the mechanism by which the message is to be routed to the destination device. One option is to specify the device at the base of the branching tree-like configuration of these buses within a computer system (i.e., a device at the "root complex") as being the destination device. Another option is to specify the destination device with a 16-bit identifying value provided within doubleword 330. Still another option is to specify the device directly connected to the requesting device that is closer to the base of the tree-like configuration of buses than the requesting device as being the destination device (i.e., the "local receiver" towards the root complex). It may be that an I/O device seeking a given hardware feature in another device may specify the root complex as being the destination device (based on the presumption that the hardware feature being sought would likely be within a device in the root complex) in the attempted message to seek the hardware feature, while a device within the root complex may respond with a message using the 16-bit identifying value of the I/O device (which would have to be received with the original attempted message from the I/O device) to specify the I/O device as being the destination device. Within byte 1 is an indication of the priority level ("traffic class") of this message relative to other messages. Within byte 2 are bits in which various options, including error detection and correction, may be selected. Filling all of byte 3 and part of byte 2 is a binary value indicating the number of doublewords of data appended to this header, if the format of this message is indicated in byte 0 as having doublewords appended to this header. If there are not appended doublewords, then the four doubleword header may make up the entire message.

Doubleword 320 is the second doubleword to be transmitted, following doubleword 310. Within byte 4 is a value identifying the bus leading towards the root complex to which the requesting device is coupled (each bus in the branching tree-like configuration of buses is identified with a unique number). Within byte 5 are a value indicating the identity of the requesting device, and a value indicating the portion of the requesting device (i.e., the "function" within the requesting device) that is transmitting this message. Bytes 4 and 5, together, make up a requester ID that is meant to uniquely identify the requesting device (i.e., the device that is transmitting the message). Within byte 6 is a value generated by the requesting device to distinguish this message from other transactions initiated by the requesting device. Together, bytes 4, 5 and 6 make up a transaction ID to uniquely identify this message to distinguish it from all other transactions taking place within the computer system of which the requesting and destination devices are a part. Within byte 7 is one of two possible values identifying the message as a vendor-defined message (i.e., a message serving a purpose chosen by the vendor of the requesting device), with the two values providing a choice of whether or not the destination device should report an error if this message is not supported by the destination device. In some embodiments, a requesting device that is seeking a given hardware feature may use this mechanism to specify that the destination device is to report an error if the destination device does not support the vendor-specific message transmitted by the I/O device as a way of determining whether or not the attempt to detect the given hardware feature was successful. Alternatively, in other embodiments, specifying that the destination device not report an error if the destination device does not support this vendor-specific message may be deemed desirable, and the requesting device seeking the given hardware feature may interpret a lack of any response to this vendor-specific message as an indication that the attempt to locate the given hardware feature within the destination device was unsuccessful.

Doubleword 330 is the third doubleword to be transmitted, following doubleword 320. Bytes 8 and 9, together, make up a destination ID that could be used to uniquely identify the destination device using bit values having an organization and interpretation similar to those used in bytes 4 and 5 of doubleword 320 to identify to the requesting device. Bytes 8 and 9 may be filled with all zeros if bits previously discussed in byte 0 of doubleword 310 are used to specify the destination device as either the "root complex" or the device that is the "local receiver" on the other end of the bus going towards the root complex in the branching tree-like set of buses. Given that the device making the attempt to detect a given hardware feature in another device must identify itself in bytes 4 and 5 of doubleword 320, the other device that receives the message transmitted to make the inquiry may use that identity information in identifying the one device making the inquiry as the destination device in a message transmitted back in response. Occupying all of both bytes 10 and 11 is a single 16-bit assigned to vendors of devices by the PCI-SIG, and which can be used to identify the vendor of the requesting device.

Doubleword 340*a* is the last of the four doublewords making up the header of the message transmitted by a device seeking to detect a given hardware feature within another device, and is the last of these four doublewords to be transmitted as part of this message. Similarly, doubleword 340*b* is the last of the four doublewords making up the header of the message that may be transmitted by the other device in response to receiving a message seeking to detect a given hardware feature. Since both the original message to seek to detect a given hardware feature and the message that may be sent in response are vendor-specific messages, the use, characteristics and organization of whatever contents are placed within fourth doubleword (i.e., doublewords 340a and 340b) are left unspecified to allow a vendor to make any use of the fourth doubleword deemed to be desirable by the vendor. Given the very unstructured nature of this vendor-specific type of message, both the requesting and destination devices must be designed (or otherwise configured in whatever way) to support both the creation and correct interpretation of the significance of any vendor-specific message that is transmitted. In effect, if both the requesting and destination devices are not somehow configured or prepared to handle the very same form of vendor-specific message, the destination device may either misinterpret the message transmitted by the requesting device, or the destination device may ignore and/or reject the message, altogether, as being a message that is unsupported by the destination device. Therefore, for the purpose of having a requesting device use this vendor-specific message to seek a given hardware feature within a destination device, the requesting device must be prepared to create and transmit a message that the destination device must be prepared to receive and interpret as being an attempt to locate that given hardware feature within the destination device, and the destination device must be prepared to provide a response to the requesting device that the requesting device is prepared to interpret as an indication that the given hardware feature was successfully located within the destination device, and possibly, as an indication of whether or not that given hardware feature is available for use with the requesting device.

Figure 3A:
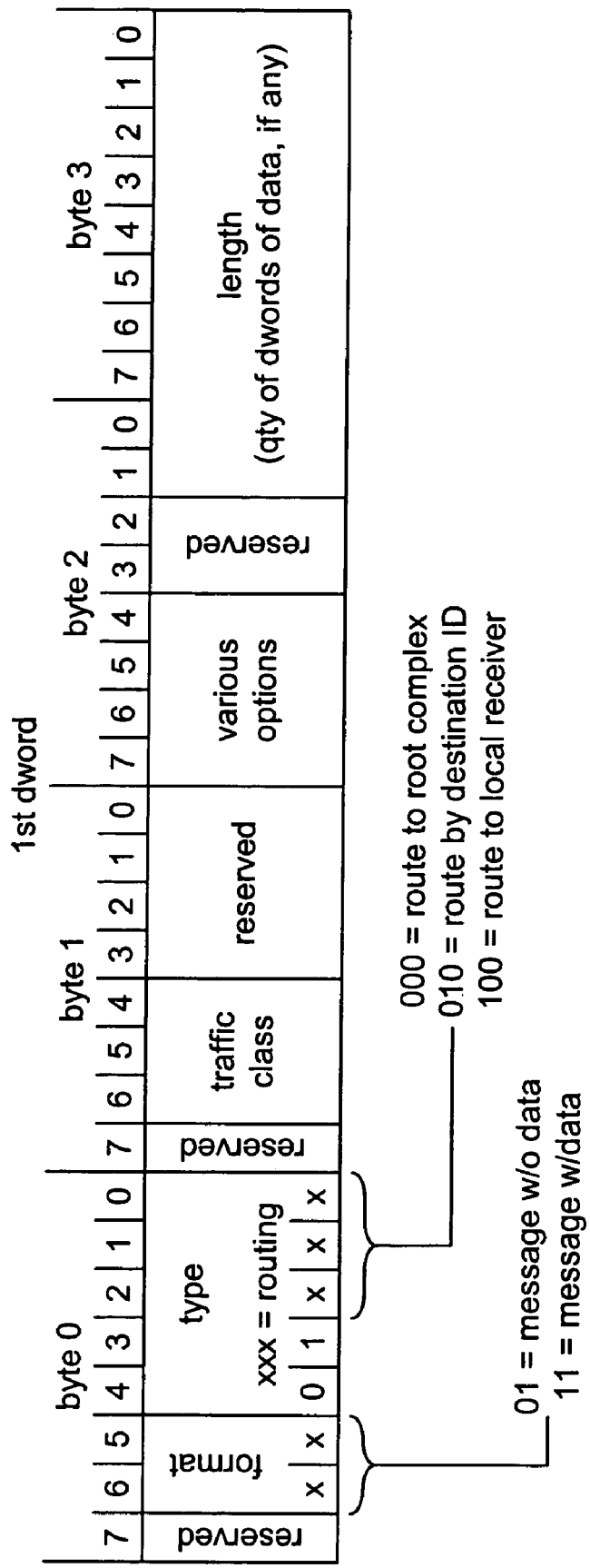
FIGS. 3a, 3b, 3c, 3d and 3e, together, depict specifics of messages of an embodiment employing an attempted transmission of a message to seek a hardware feature.
Figure 3B:
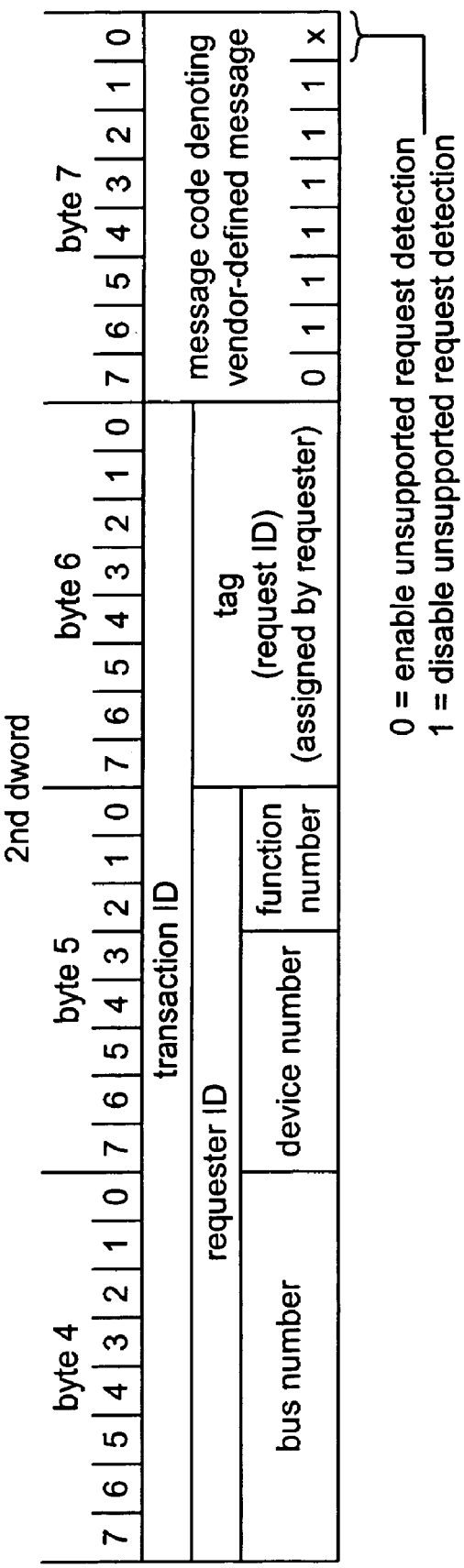
Figure 3C:
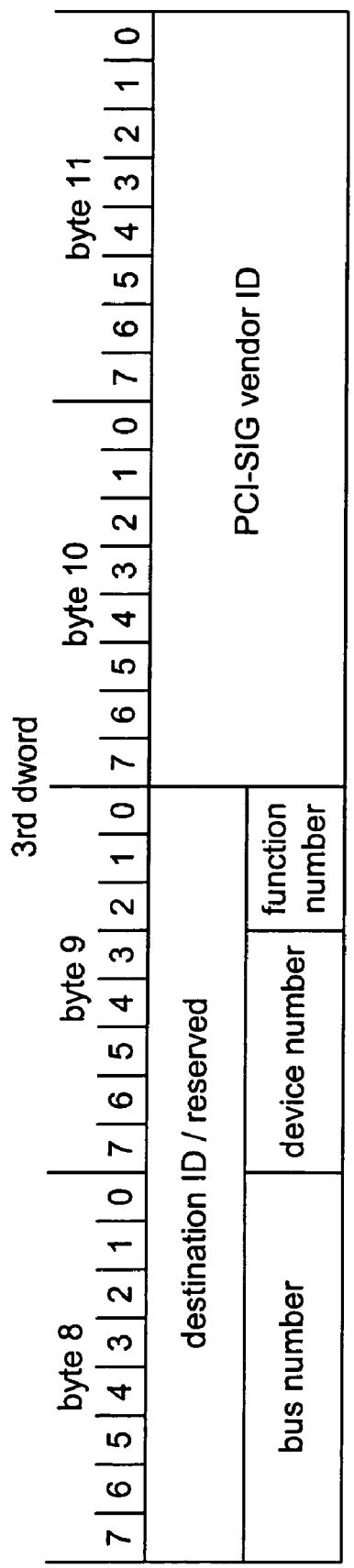
Figure 3D:
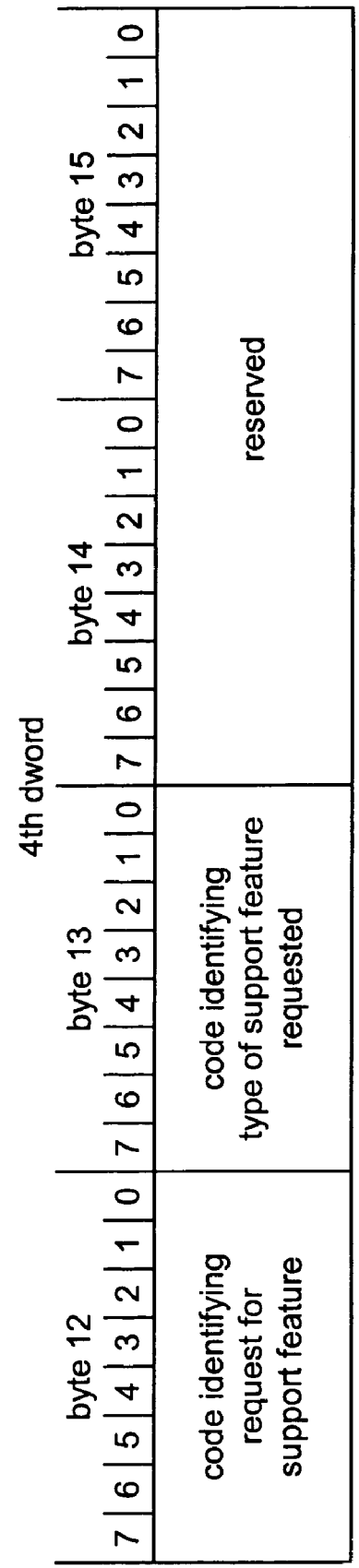

A possible embodiment of an arrangement of values to communicate an effort by one device to seek the given hardware feature within the another device is depicted in FIG. 3d as being conveyed within doubleword 340a, though alternative embodiments may employ one or more doublewords appended to the header made up of doublewords 310, 320, 330 and 340a to convey some or all of such values to the other device. As depicted in FIG. 3d, within byte 12 is a location allocated for a code devised by a vendor to communicate from the requesting device to the destination device that this message is part of an attempt by the requesting device to seek the given hardware feature within the destination device. Within byte 13 is a location allocated for a code devised by the vendor to indicate what hardware feature is the given hardware feature being sought.

Figure 3E:
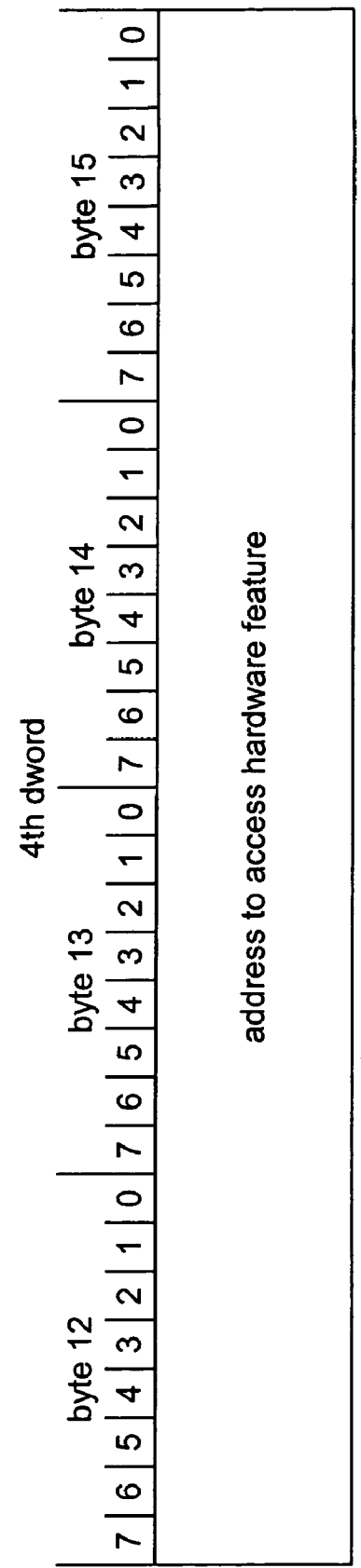

A possible embodiment of an arrangement of values to communicate a response by the other device to an effort by the one device to seek the given hardware feature within the other device is depicted in FIG. 3e as being conveyed within doubleword 340b, though alternative embodiments may employ one or more doublewords appended to the header made up of doublewords 310, 320, 330 and 340b to convey some or all of such values to the one device. As depicted in FIG. 3e, occupying all of bytes 12, 13, 14 and 15 is at least a portion of an address pointing to the starting address of one or more registers (or perhaps, one or more memory locations reserved within a memory device, possibly serving as "virtual" registers) that may be accessed by the one device to control the given hardware feature sought by the one device within the other device. In such an embodiment, the receipt of this address may be taken by the one device as an indication of success in detecting the given hardware feature within the other device.

Figure 4:
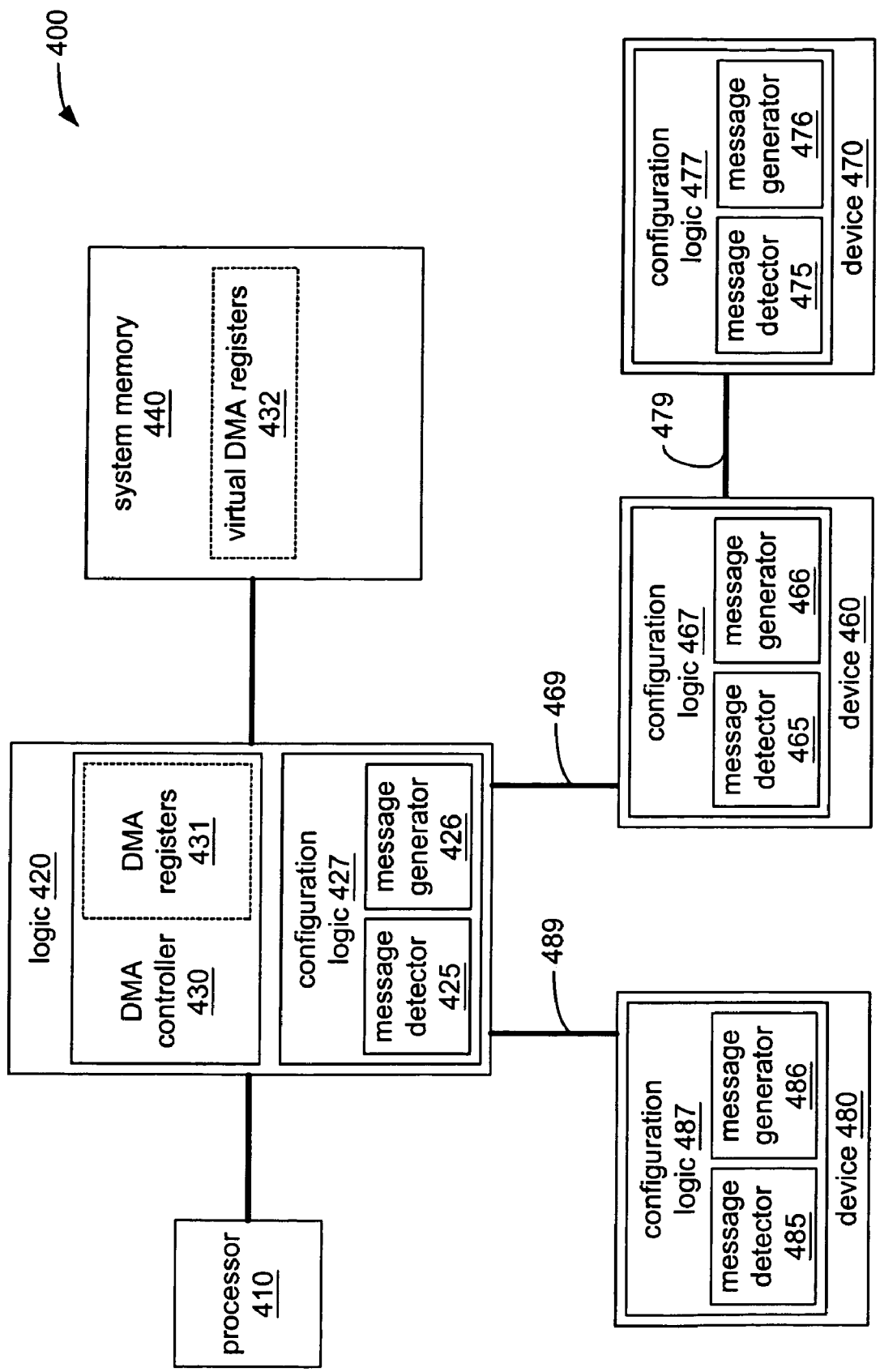
FIG. 4 is yet another block diagram of other embodiments employing a computer system.

FIG. 4 is yet another block diagram of embodiments employing a computer system. The numbered items in FIG. 4 are meant to generally correspond to the number items in FIGS. 1 and 2, and in a manner not unlike computer systems 100 and 200, computer system 400 is, at least in part, made up of processor 410, bus 419, logic 420, bus 449, and system memory 440. As was the case with computer systems 100 and 200, those skilled in the art will readily recognize that this is but one example of many possible forms of core of computer system 400, and that computer system 400 may also be further made up of other buses and devices not shown.

Like logics 120 and 220, logic 420 is coupled to processor 410, system memory 440 and other possible devices via buses 419, 449 and 469, respectively, as well as bus 489, and performs various functions in support of execution of instructions by processor 410, including controlling and providing processor 410 with access to system memory 440 and serving as a bridge. Furthermore, to relieve processor 410 of some of the burden of carrying out some transfers of blocks of data, an example hardware feature of logic 420 may, in some embodiments, be DMA controller 430

Somewhat like embodiments discussed with reference to computer systems 100 and 200, in computer system 400, buses 469 and 489 couple logic 420 to devices 470 and 480. However, the coupling with device 480 is directly with logic 420 through bus 489, and the coupling with device 470 is indirectly through intervening logic 460 and bus 479, as well as bus 469. Also, devices 269, 279 and 289 may be any of a wide variety of types of devices.

Also somewhat like computer systems 100 and 200, logic 420, intervening device 460, device 470 and device 480 of computer system 400 provide configuration logics 427, 467, 477 and 487, respectively, to permit enabling of functionality and/or configuration via processor 410 executing software at a time when computer system 400 is powered on and/or reset. Again, in various embodiments, the accessing of configuration logics 427, 467, 477 and/or 487 may be a prerequisite to allowing one or more of logic 420, intervening device 460, device 470 and device 480 to interact with buses 469, 479 and/or 489 more filly than may be needed to carry out configuration.

In some embodiments, after accesses made by processor 410 to configuration logics 427, 467, 477 and/or 487 to carry out configuration functions, message generator 486 of configuration logic 487 of device 480 attempts to transmit a message having a header similar to that depicted in FIGS. 3a-d across bus 489 to configuration logic 427 of logic 420, seeking to enable the use of DMA controller 430 with device 480. The message may provide a vendor ID, a device ID, an indicator of the function(s) performed by device 480, and/or other data that message detector 425 receives and may use to determine whether or not the message is supported by logic 420. In some variations, the message provides a vendor ID that is used by message detector 425 as a form of key used message detector 425 to determine whether or not to respond to the message, and a code that informs message detector 425 that a hardware feature, such as DMA controller 430, is being sought. In some variations, if message detector determines that message is not supported, then message detector 425 may ignore the message, entirely, while in other variations, message detector 425 may signal an error, and this choice of response may be determined by a flag bit set within the message.

If message detector 425 determines that the message is a supported message, then in some variations, message 426 generator, also within configuration logic 427, transmits a message back to configuration logic 487 of device 480 indicating the availability of DMA controller 430. Alternatively, the determination by message detector 425 of a message being supported in other variations may result in message generator 426 transmitting a message to configuration logic 487 that provides one or more addresses to DMA registers 431 within DMA controller 430 and/or virtual DMA registers 432 within system memory 440 where data concerning the status and/or availability of DMA controller 430 may be read. The transmitted address may be a pointer, in some variations, to a linked-list type of data structure in which multiple pieces of data may provide various pieces of information concerning what may possibly be multiple assignable portions of DMA controller 430, one of which may be assigned for use with device 480 in response to the original message transmitted by configuration logic 487. In still other variations a data structure (possibly of a linked-list configuration) may be transmitted directly to configuration logic 487, instead of an address, to directly provide configuration logic 487 with an indication as to the availability of DMA controller 430 for use with device 480.

In other embodiments, after accesses made by processor 410 to configuration logics 427, 467, 477 and/or 487 to carry out configuration functions, message generator 476 of configuration logic 477 of device 470 attempts to transmit a message having a header similar to that depicted in FIGS. 3*a*-*d* across bus 479, seeking to enable the use of DMA controller 430 with device 480. In some of these embodiments in which configuration logic 477 is in some way provided with information concerning the configuration and identities of buses and devices within computer system 400 such that a message specifying logic 420 with a unique identifier is able to be generated by message generator 476, then message generator 476 may make use of such information to do precisely that. However, in others of these embodiments, there may be no indication provided to configuration logic 477 that intervening device 460 exists between device 470 and logic 420 such that any message used to seek DMA controller 430 will have to be transferred through intervening device 460.

In some variations, to ensure that a message transmitted by message generator 476 will be transmitted through intervening device 460, the message may carry an indication that the destination device to which the message should be relayed is the device designated within computer system 400 as being the root complex device (i.e., the device that is at the base of a branching tree-like configuration of buses within computer system 400 of which buses 469 and 479 are a part), if it is known that a hardware feature such as DMA controller 430 that is being sought will likely exist within the root complex device (and presuming that logic 420 is deemed to be at least part of the root complex of computer system 400). With the root complex device being specified as the destination device, message detector 465 and message generator 466 within configuration logic 467 of intervening device 460 may cooperate to retransmit the message received from device 470 across bus 479 onward across bus 469 towards logic 420.

In other variations, the message may carry an indication that whatever device is present on the other end of bus 469 is the destination device, resulting in the message being received by message detector 465, and message detector 465 may cooperate with message generator 466 to pass the message onward in the direction of the base of the branching tree-like configuration of buses, which would result in the message being passed on through bus 469 to logic 420. Relying upon logic within configuration logic 467 of device 460 to pass on a message in this manner may require that that intervening device 460 is provided by the same vendor as device 470 such that a message transmitted to intervening device 460 (possibly a message carrying a specific vendor ID) and that is not supported by intervening device 460 will be reliably forwarded to another device.

However the message transmitted by configuration logic 477 towards configuration logic 427 of logic 420 is ultimately received by message detector 425, message generator 476 may make use of information carried by the message from message generator 476 that uniquely identifies device 470 as the original source of the message to provide an identifier uniquely specifying device 470 as the destination device in whatever message that message generator 426 may send as a reply to configuration logic 477 of device 470.

In still other embodiments, both message generators 476 and 486 of configuration logics 477 and 487, respectively, may attempt to send messages towards configuration logic 427 of logic 420 to enable use of DMA controller 430 with devices 470 and 480, respectively. In some variations, where it may not be possible to make DMA controller 430 available to both devices 470 and 480 configuration logic 427 may carry out a form of arbitration in which only one of these two message is responded to with an indication that at least a portion of DMA controller 430 has been assigned for use with that device. Alternatively, both devices 470 and 480 may be responded to with messages providing an address as a pointer to a location either within DMA registers 431 or virtual DMA registers 432 where both devices may obtain information concerning status and/or availability of DMA controller 430, and where, perhaps, one or more status bits are provided that allow devices 470 and 480 to arbitrate with each other, directly, for access to DMA controller 430.

However, where both message generators 476 and 486 attempt the transmission of messages to gain the use of DMA controller 430 with devices 470 and 480, respectively, and the possibility exists to make provide both devices 470 and 480 with the ability to work with DMA controller 430 (perhaps with different portions of DMA controller 430), then message generator 426 may send messages to each of configuration logics 477 and 487 providing different addresses that serve as pointers to different portions of either DMA registers 431 or virtual DMA registers 432. Alternatively, the messages sent to both configuration logics 477 and 487 may carry the same address pointing to a single data structure (perhaps a linked-list form of data structure) within either DMA registers 431 or virtual DMA registers 432 that both devices 470 and 480 may access, but which contains separate pieces of data for coordinating use of DMA controller 430 with each device in separate portions of that single data structure.

Additionally, in embodiments or variations of embodiments in which both devices 470 and 480 are required to arbitrate directly with each other for use of at least portions of DMA controller 430 (or whatever other hardware feature provided by logic 420), devices 470 and 480 may selectively relinquish and/or restart arbitration with each other to share such a hardware feature of logic 420 during normal operation of computer system 400. It may be that one or the other of devices 470 and 480 require a given hardware feature of logic 420 for only a limited period of time as part of the initialization of computer system 400, and from then on, may allow that hardware feature to be assigned to another device for subsequent use.

Figure 5:
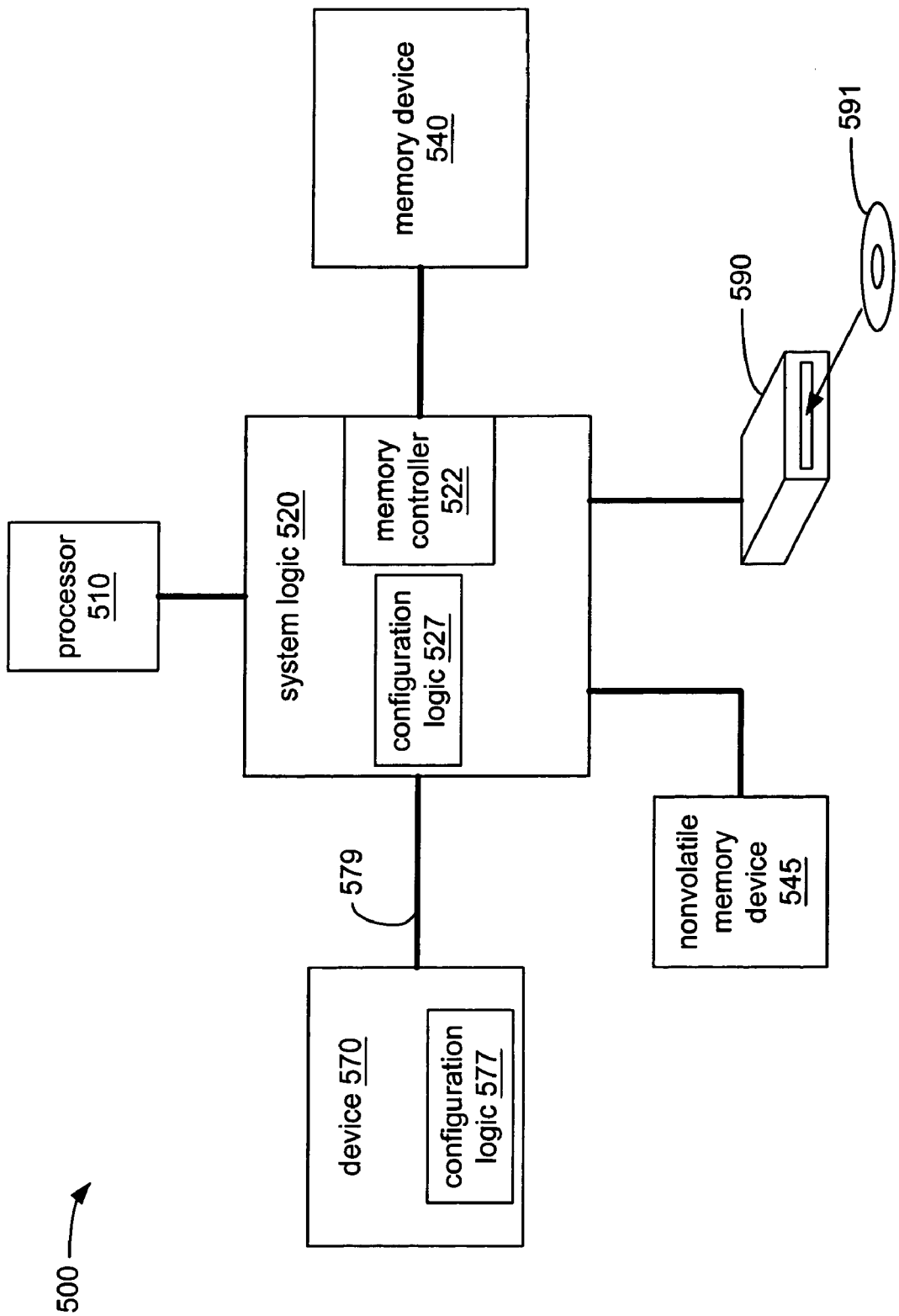
FIG. 5 is still another block diagram of other embodiments employing a computer system.

FIG. 5 is a block diagram of an embodiment employing a computer system. Computer system 500 is, at least in part, made up of processor 510, system logic 520, and memory device 540. System logic 520 is coupled to processor 510 and performs various functions in support of processor 510 including providing processor 510 with access to memory device 540 to which system logic 520 is also coupled, using memory controller 522 within system logic 520. Processor 510, system logic 520 and memory device 540 make up a form of core for computer system 500 that is capable of supporting the execution of machine readable instructions by processor 510 and the storage of data and instructions within memory device 540. Alternatively, in other embodiments, memory controller 522 may be either partially or entirely integrated within processor 510, with the possible result of processor 510 being directly coupled to and having direct access to memory device 540.

In some embodiments, system logic 520 is coupled to and provides processor 510 with access to storage device 590 by which data and/or instructions carried by storage media 591 may be accessed. Storage media 591 may be of any of a wide variety of types and technologies as those skilled in the art will understand, including CD or DVD ROM, magnetic or optical diskette, magneto-optical disk, tape, semiconductor memory, characters or perforations on paper or other material, etc. In some embodiments, nonvolatile memory device 545 is coupled to system logic 520 (or another part of computer system 500) and provides storage for an initial series of instructions executed at a time when computer system 500 is either "reset" or initialized (for example, when computer system 500 is "turned on" or "powered up") to perform tasks needed to prepare computer system 500 for normal use. In some variations of such embodiments, upon initialization or resetting of computer system 500, processor 510 accesses nonvolatile memory device 545 to retrieve instructions to be executed to prepare memory controller 522 for normal use in providing access for CPU 510 to memory device 540 and/or to configure system logic 520 and device 570 via configuration logics 527 and 577. It may be that these same retrieved instructions are executed to prepare system logic 520 for normal use in providing access to storage device 590 and whatever form of storage media 591 that may be used by storage device 590.

Processor 510 may be further caused by instructions stored within either storage media 591 or nonvolatile memory device 545 and executed by processor 510 to install a portion of software, a data structure, gate array settings and/or microcode carried within one or both configuration logics 527 and 577 that cause configuration logic 527 to attempt a transaction across bus 579 to gain the use of a hardware feature within system logic 520 with device 570 and/or cause configuration logic 577 to respond to such an attempt at a transaction by providing device 570 with the use of the hardware feature being sought.

Figure 6:
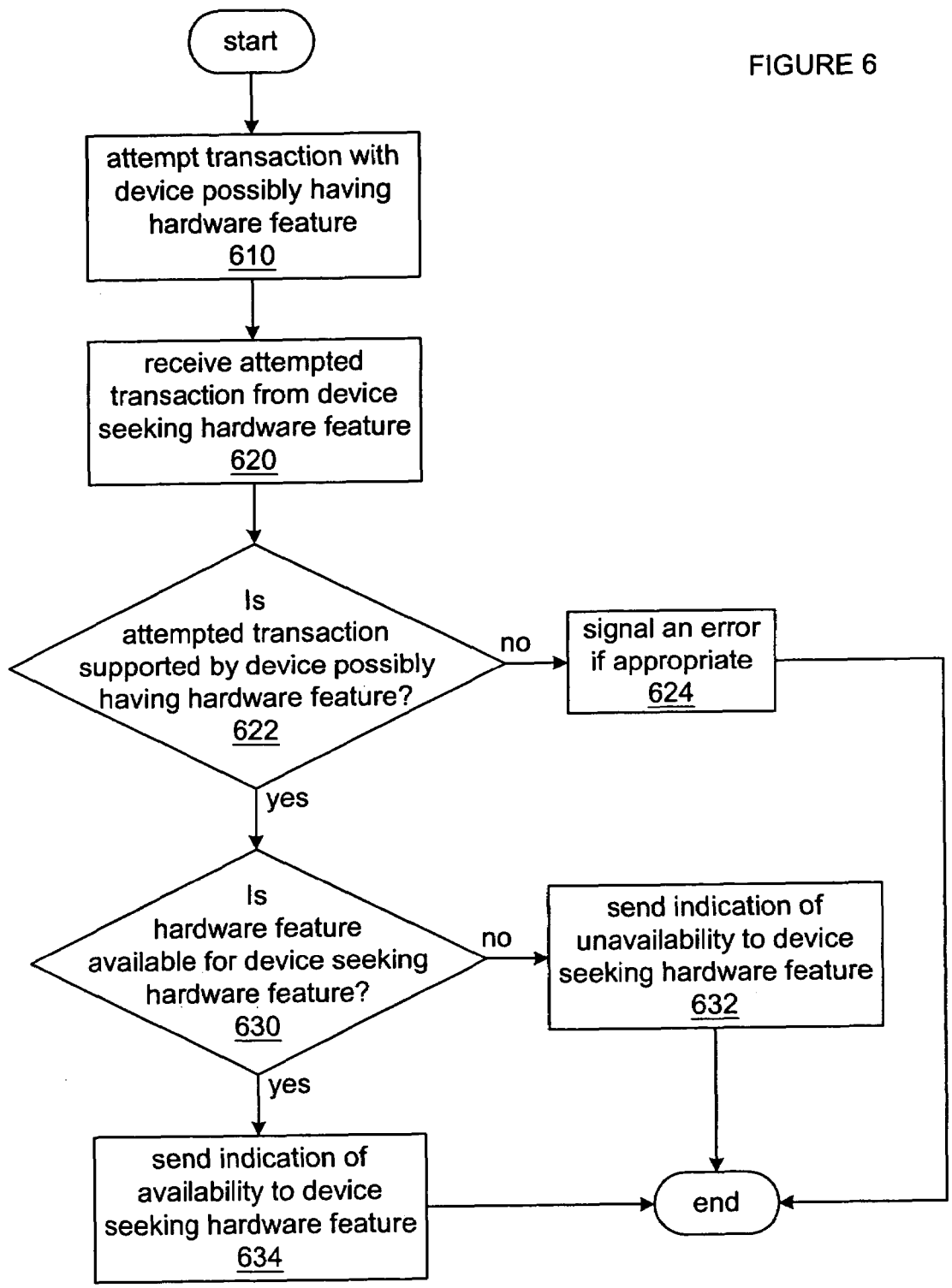
FIG. 6 is a flow chart of an embodiment.

FIG. 6 is a flow chart of an embodiment. At 610, a device seeking a particular hardware feature attempts a transaction with a device that may have the hardware feature, and the attempted transaction is received from the device seeking the given hardware feature at 620 by the device that may have the hardware feature. If at 622, logic within the device that may have the hardware feature determines that the attempted transaction is not supported, i.e., that the device that may have the hardware feature does not have the hardware feature, then an error is signaled at 624. However, if at 622, it is determined that the device that may have the hardware feature does indeed have the hardware feature, and so the attempted transaction is supported, then at 630, a check is made to determine if the hardware feature is available for use with the device seeking the hardware feature. If at 630, the hardware feature is not available for use with the device seeking the hardware feature, then at 632, an indication is sent to the device seeking the hardware feature of the unavailability of that hardware feature. However, if at 630, the hardware feature is determined to be available for use with the device seeking the hardware feature, then an indication of the availability of the hardware feature is sent to the device seeking the hardware feature at 634.

In alternative embodiments, it may be that a determination of an attempted transaction not being supported at 622 results in the attempted transaction simply being ignored, instead of the signaling of an error at 624. Also, in other embodiments, it may be that the indication of availability of the hardware feature sent at 634 is accompanied by data and/or an address pointing to either registers or a memory location to aid in enabling the device seeking the hardware feature with configuring and/or using the hardware feature.

Figure 7:
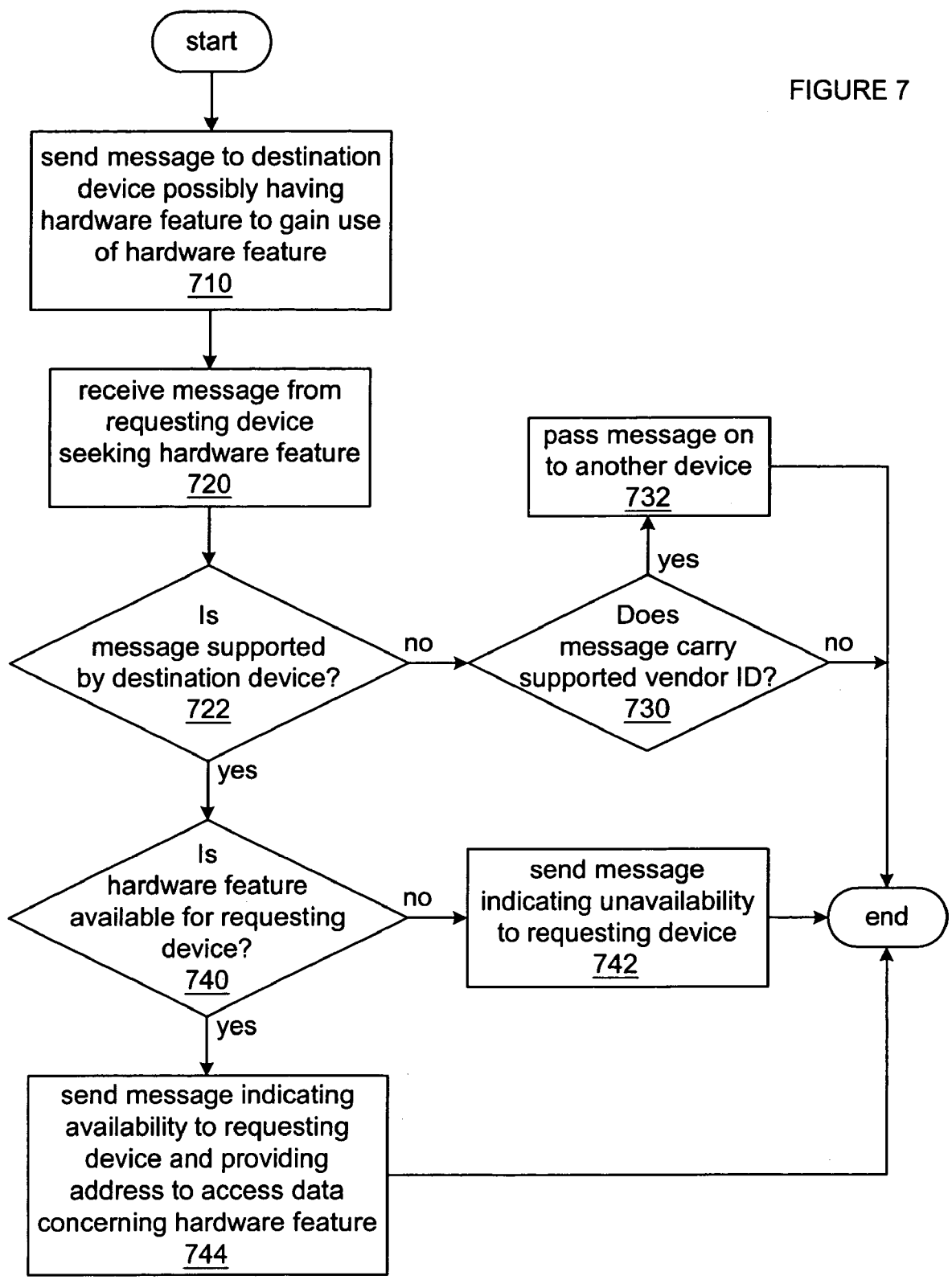
FIG. 7 is a flow chart of another embodiment.

FIG. 7 is a flow chart of an embodiment. At 710, a requesting device seeking a particular hardware feature attempts to transmit a message to a destination device that may have the hardware feature, and the message is received by the destination device at 720. If at 722, logic within the destination device determines that the attempted transaction is not supported, i.e., that the destination device does not have the hardware feature, then the message is checked at 730 to determine if it carries an ID for a vendor for which the destination device provides further support. If the vendor ID is supported at 730, then at 732, the message is passed on to another device that may have the hardware feature being sought by the requesting device (unless the destination device is at a position in a hierarchy of buses such that there isn't another device to which the message could be passed). However, if at 722, it is determined that the destination device does have the hardware feature, and so the attempted transaction is supported, then at 740, a check is made to determine if the hardware feature is available for use with the requesting device. If at 740, the hardware feature is not available for use with the requesting device, then a message indicating the unavailability of the hardware feature is sent to the requesting device at 742. However, if at 740, the hardware feature is determined to be available for use with the requesting device, then a message indicating the availability of the hardware feature and providing an address to serve as a pointer to access data concerning the hardware feature at 744.

Figure 8A:
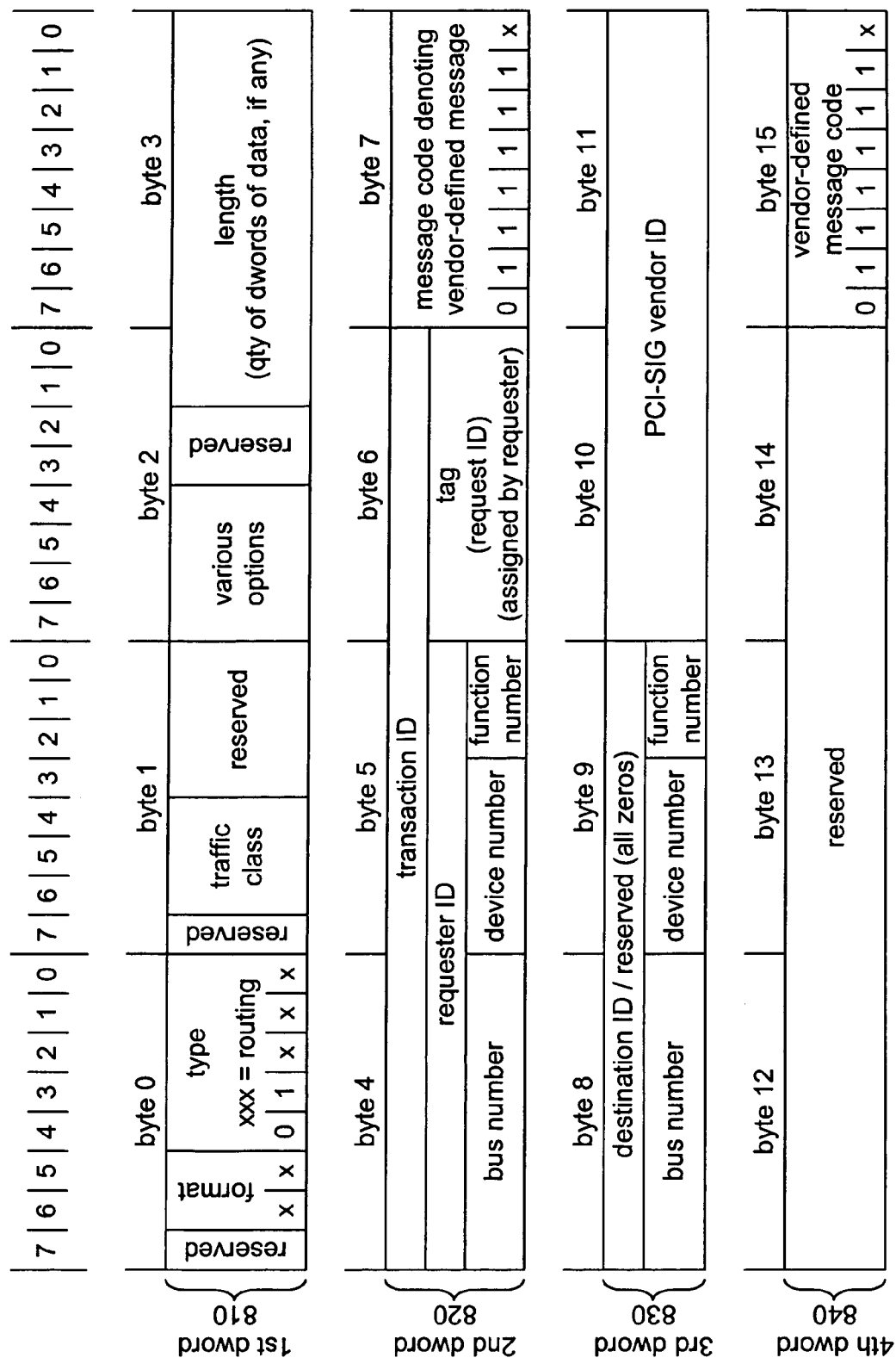
FIGS. 8a, 8b and 8c, together, depict specifics of messages of another embodiment employing an attempted transmission of a message to seek a hardware feature.
Figure 8B:
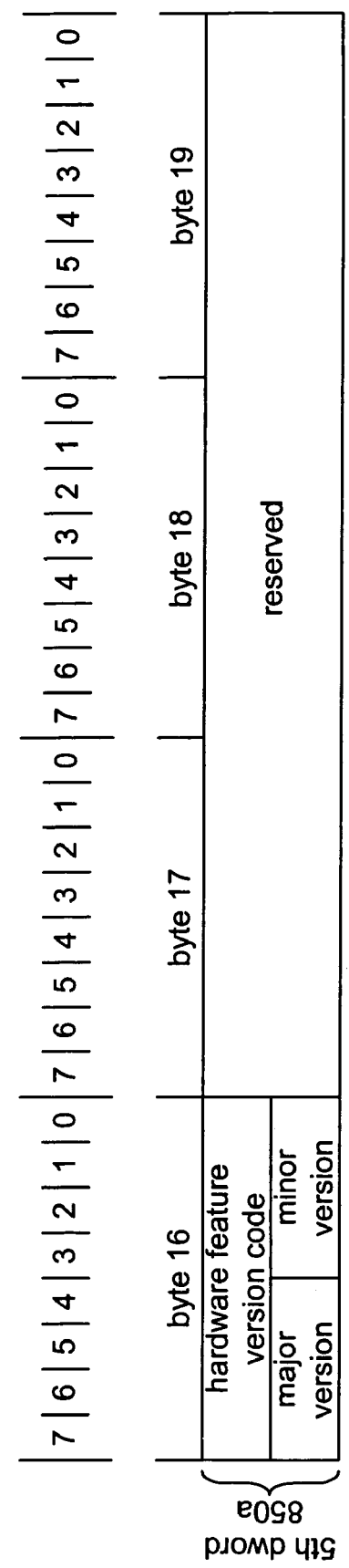
Figure 8C:
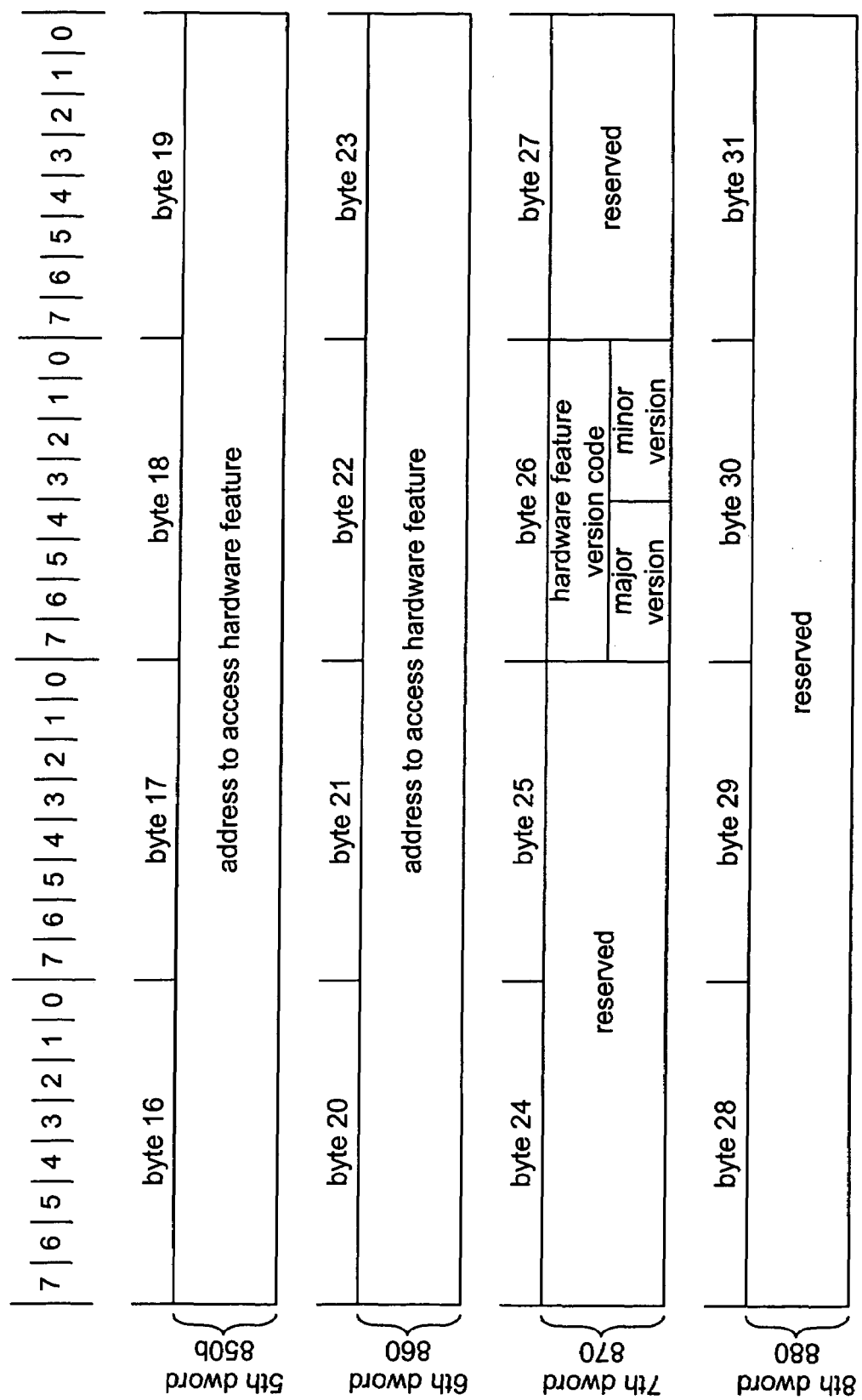

FIGS. 8*a*, 8*b* and 8*c* depict another embodiment employing an attempted message transaction and possible response across a bus that supports the transmission of messages. FIGS. 8*a-b*, together, depict features of a possible organization of bits of information conveyed in at least the header portion of a packetized message that a device seeking to detect and/or configure a given hardware feature would attempt to send, and FIGS. 8*a* and 8*c*, together, depict similar features of a packetized message that may be sent by the other device in response to the attempted message. In both cases, the depicted organization of bits is intended to be operable with a bus architecture employing multiple point-to-point buses organized in a branching tree-like configuration across which addresses, commands, data and other information are transferred in packetized form across digital serial connections. As is the case with FIGS. 3*a-e*, although the specific allocation of bits of information need not conform to any one standard or convention to be within the spirit and scope of the claimed invention, an arrangement of bits of information is depicted that is intended to be in compliance with the requirements of the currently emerging PCI-Express bus specification.

Doublewords 810, 820, 830 and 840 make up at least the first four doublewords (blocks of four bytes) of both a packetized message that a device seeking a given hardware feature may attempt to transmit in an effort to test another device in which the given hardware feature may be present, a packetized message that the other device may transmit in response. For sake of clarity, it should be noted that doublewords 810, 820 and 830 of FIG. 8*a* are largely identical to doublewords 310, 320 and 330, respectively, of FIGS. 3*a-c*, with significant differences tending to be more in the latter doublewords, starting with doubleword 840, and so the discussion that follows will tend to focus more on what aspects are different from doublewords 310, 320, 330, 340*a* and 340*b*. For those aspects that are very much the same, the reader is invited to review the above description corresponding to FIGS. 3*a-e*.

Doubleword 810 is the first doubleword to be transmitted, followed in turn by doublewords 820, 830, etc. Although much about doubleword 810 is identical to doubleword 310, the messages of which doubleword 810 is a part have additional doublewords appended to them to provide additional space for data, so bits 6 and 5 of byte 0 of doubleword 810 will each carry a binary value of 1 to indicate that there are additional doublewords. Filling all of byte 3 and part of byte 2 is a 10-bit binary value indicating the number of doublewords of data appended to the header of the given message, if the format of this message is indicated in byte 0 as having doublewords appended to this header. As will be discussed in more detail, unlike doubleword 310, which was part of a header to which no doublewords were appended, with the result that this 10-bit value would be filled with zeros, for doubleword 810 there is 1 appended doubleword in a message sent by a device to seek to detect a hardware feature in another device, and there are 4 appended doublewords in a message that may be sent by the other device in response. So, in the case of the message seeking to detect a hardware feature, the 10-bit value would be a binary 00:0000:0001, while in the case of the possible return message, the 10-bit value would be a binary 00:0000:0100.

Doubleword 820 is the second doubleword to be transmitted, following doubleword 310, and is largely identical to doubleword 320. Also, doubleword 330 is the third doubleword to be transmitted, following doubleword 320, and is largely identical to doubleword 830.

Doubleword 840 is the last of the four doublewords making up the header of both the message transmitted by a device seeking to detect a given hardware feature within another device, and is the last of these four doublewords to be transmitted as part of this message, and so is very dissimilar to both doublewords 340*a* and 340*b*. Bytes 12, 13 and 14 of doubleword 840 are unused, while byte 15 of doubleword 840 may carry an 8-bit vendor-defined message code. In one embodiment, this 8-bit code may be a binary value of 0000:0010 to provide an indication that the message is being sent by one device to seek to detect hardware features, generally, in the destination device, or in another embodiment, this same 8-bit code may provide an indication that the message is being sent by one device to seek to detect a specific hardware feature (or specific hardware features) in the destination device. In another embodiment, this 8-bit code may be a binary value of 0000:0011 to provide an indication that the message is being sent by the other device back to the one device in response to a message transmitted by the one device seeking one or more hardware features within the other device, and/or perhaps, that the message being sent in response is conveying an address at which the one device may access one or more hardware features.

Doubleword 850*a* is the one appended doubleword belonging to a message transmitted by a device seeking to detect a hardware feature in another device. Byte 16 of doubleword 850*a* carries a pair of 4-bit values indicating a major and minor version numbers. In one embodiment, the major and minor version numbers indicate the version (more precisely, perhaps, which implementation) of the hardware feature that the one device is seeking as a way of indicating to the other device what version of the hardware feature that the one device is interoperable (or "compatible" as is the common term used in the computer industry) with. In another embodiment, the major and minor version numbers indicate the version (perhaps, the implementation) of the one device, itself. It may be that the other device will use the major and minor version numbers in determining whether or not to transmit a message in response, as it may be deemed to be desirable to provide a lack of response where there may be a lack of interoperability between the one device and the hardware feature, thereby possibly mimicking a situation where the hardware feature is simply not present in the other device, or mimicking a situation where the other device simply does not support the message sent by the one device to seek to detect the hardware feature.

Doublewords 850*b* and 860 are the first two of four appended doublewords belonging to a message that may be transmitted by another device in response to receiving a message transmitted by one device to seek to detect a hardware feature that the one device seeks to interact with. Together, doublewords 850*b* and 860 carry at least one address up to 64-bits wide specifying an address location at which registers and/or memory locations (perhaps, memory locations serving as virtual registers) that may be accessed for interaction with the hardware feature by the one device seeking to detect the hardware feature. In some embodiments, the value(s) conveyed within the 64 bits provided by both doublewords 850*b* and 860 may convey other information in lieu of or in addition to an address. For example, all zeros, all ones, or some other specific binary value(s) in at least a subset of these 64 bits may convey an indication of status of a hardware feature, such as lack of availability (perhaps, only temporarily, with the implication that the one device should make another attempt to gain access to the hardware feature at some later time), or lack of success in winning an arbitration with yet another device to provided with access to the hardware feature, etc.

Doubleword 870 is the third of four appended doublewords belonging to a message that may be transmitted by another device in response to receiving a message transmitted by one device to seek to detect a hardware feature that the one device seeks to interact with, following doublewords 850*b* and 860. Bytes 24, 25 and 27 of doubleword 870 are reserved, possibly for other purposes, or to not be used, at all. Byte 26 of doubleword 870 carries a pair of 4-bit values indicating a major and minor version numbers. In one embodiment, the major and minor version numbers indicate the version (more precisely, perhaps, which implementation) of the hardware feature that the other device provides as a way of indicating to the one device seeking the hardware feature what version of the hardware feature is available for use. In another embodiment, the major and minor version numbers indicate the version of the other device, itself. In still another embodiment, the major and minor version numbers may specify a version of the hardware feature that the other device is able to mimic in some way. It may be that the one device seeking the hardware feature may use the major and minor version numbers provided by the other device in determining whether or not it is possible to interact correctly with that hardware feature. It may be that in still other embodiments the determination of whether or not interaction between the one device and the hardware feature within the other device is possible may be made by both the one device and other device, with each device checking the major and minor version numbers it receives for an indication of the interoperability (or lack thereof) required (or desired) to engage in such an interaction. Such checking of major and/or minor version numbers, whether carried out by only one or by both devices, may be deemed desirable where it is possible for an end user to choose to couple together different pairs of devices without an understanding of the interoperability or lack thereof, thereby allowing the devices, themselves, to autonomously make this determination.

Since both the original message to seek to detect a given hardware feature and the message that may be sent in response are vendor-specific messages, the use, characteristics and organization of whatever contents are placed within the doublewords appended to the header (i.e., either doubleword 850a, or doublewords 850b, 860, 870 and 880) are left unspecified to allow a vendor to make any use of the fourth doubleword deemed to be desirable by the vendor. Like the messages of FIGS. 3a-e, the very unstructured nature of this vendor-specific type of message requires that both the requesting and destination devices both be designed (or otherwise configured in whatever way) to support both the creation and correct interpretation of the significance of any vendor-specific message that is transmitted. In effect, if both the requesting and destination devices are not somehow configured or prepared to handle the very same form of vendor-specific message, the destination device may either misinterpret the message transmitted by the requesting device, or the destination device may ignore and/or reject the message, altogether, as being a message that is unsupported by the destination device. Therefore, for the purpose of having a requesting device use this vendor-specific message to seek a given hardware feature within a destination device, the requesting device must be prepared to create and transmit a message that the destination device must be prepared to receive and interpret as being an attempt to locate that given hardware feature within the destination device, and the destination device must be prepared to provide a response to the requesting device that the requesting device is prepared to interpret as an indication that the given hardware feature was successfully located within the destination device, and possibly, as an indication of whether or not that given hardware feature is available for use with the requesting device.

Doubleword 880 is the fourth of four appended doublewords belonging to a message that may be transmitted by another device in response to receiving a message transmitted by one device to seek to detect a hardware feature that the one device seeks to interact with, following doublewords 850b, 860 and 870. All of bytes 28 through 31 are reserved, perhaps of other possible future use(s).

FIG. 9 is a flow chart of still an embodiment. At 910, a requesting device seeking a particular hardware feature attempts to transmit a message to a destination device that may have the hardware feature, and the message is received by the destination device at 920. If at 930, a check is made to determine if the hardware feature is available for use with the requesting device. If at 930, the hardware feature is not available for use with the requesting device, then a message indicating the unavailability of the hardware feature is sent to the requesting device at 940. However, if at 930, the hardware feature is determined to be available for use with the requesting device, then the version number received with the message sent in the attempt by the requesting device is checked at 950 to determine if the version of hardware feature that the requesting device is inquiring about is either the same as that which the destination device has within or is at least interoperable with the version that the destination device has within such that the requesting device could correctly interact with the version of the hardware feature that is within the destination device. If it is found at 950 that the version of hardware feature is neither the same as the version indicated in the original attempted message, nor is interoperable with the requesting device, then a message indicating the unavailability of the hardware feature is sent at 940. Otherwise, a message indicating the availability of the hardware feature and providing an address to serve as a pointer to access data concerning the hardware feature at 960.

The invention has been described in conjunction with the various possible embodiments. It is evident that numerous alternatives, modifications, variations and uses will be apparent to those skilled in the art in light of the foregoing description. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. An integrated circuit comprising:
   an interface to a bus; and
   configuration logic to transmit a query message through the bus and directed at another integrated circuit to query for availability of a hardware feature within the other integrated circuit, and to access the hardware feature within the other integrated circuit if a reply message is received from the other integrated circuit providing an indication of availability of the hardware feature within the other integrated circuit, wherein the configuration logic transmits a version number within the query message identifying a version of the integrated circuit.

2. The integrated circuit of claim 1, wherein the interface is able to be coupled to a point-to-point bus having at least one serial data link across which the query message is transferred in packetized form.

3. The integrated circuit of claim 2, wherein the query message transmitted by the configuration logic is a vendor-specific message conforming to support provided by the bus for a transmission of the vendor-specific message.

4. The integrated circuit of claim 1, wherein the hardware feature for which the integrated circuit queries for availability is a DMA controller.

5. The integrated circuit of claim 1, wherein the configuration logic accesses the hardware feature within the other integrated circuit using an address provided by the other integrated circuit within the reply message.

6. The integrated circuit of claim 5, wherein the configuration logic accesses the hardware feature to arbitrate for an opportunity to interact with the hardware feature.

7. An integrated circuit comprising:
   an interface to a bus; and
   configuration logic to transmit a query message through the bus and directed at another integrated circuit to query for availability of a hardware feature within the other integrated circuit, and to access the hardware feature within the other integrated circuit if a reply message is received from the other integrated circuit providing an indication of availability of the hardware feature within the other integrated circuit, wherein the configuration logic transmits a version number within the query message identifying a version of the hardware feature that the integrated circuit seeks.

8. An integrated circuit comprising:
an interface to a bus;
a hardware feature to interact within another integrated circuit across the bus; and
configuration logic to receive a query message through the bus and directed at the integrated circuit to query for availability of the hardware feature, and to selectively reply to the query message by transmitting with a reply message providing an indication of availability of the hardware feature, wherein the configuration logic transmits a version number within the reply message identifying a version of the hardware feature.

9. The integrated circuit of claim 8, wherein the interface is able to be coupled to a point-to-point bus having at least one serial data link across which the query and reply messages are transferred in packetized form.

10. The integrated circuit of claim 9, wherein the reply message transmitted by the configuration logic is a vendor-specific message conforming to support provided by the bus for a transmission of the vendor-specific message.

11. The integrated circuit of claim 8, wherein the hardware feature for which the other integrated circuit queries for availability is a DMA controller.

12. The integrated circuit of claim 8, wherein the configuration logic provides an address within the reply message that the other integrated circuit could use to access the hardware feature.

13. The integrated circuit of claim 12, wherein the hardware feature supports being accessed by the other integrated circuit to arbitrate for an opportunity to interact with the hardware feature.

14. An integrated circuit comprising:
an interface to a bus;
a hardware feature to interact within another integrated circuit across the bus; and
configuration logic to receive a query message through the bus and directed at the integrated circuit to query for availability of the hardware feature, and to selectively reply to the query message by transmitting with a reply message providing an indication of availability of the hardware feature, wherein the configuration logic transmits a version number within the reply message identifying a version of the hardware feature that the hardware feature within the integrated circuit mimics.

15. An electronic device comprising:
a bus;
a device coupled to the bus having a first configuration logic to carry out a query transaction on the bus to query for the availability of a hardware feature;
a system logic having the hardware feature, and having a second configuration logic to receive the query transaction and to selectively respond with an indication of availability of the hardware feature; and
a processor coupled to the system logic,
wherein the bus supports the transfer of a vendor-defined message, and the query transaction is a vendor-defined query message transmitted across the bus, and further wherein the first configuration logic transmits a version number within the query message indicating a version of the hardware feature that the device is able to interact with.

16. The electronic system of claim 15, wherein the bus is a point-to-point bus having at least one serial data link across which the query message is transferred in packetized form.

17. An electronic device comprising:
a bus;
a device coupled to the bus having a first configuration logic to carry out a query transaction on the bus to query for the availability of a hardware feature;
a system logic having the hardware feature, and having a second configuration logic to receive the query transaction and to selectively respond with an indication of availability of the hardware feature; and
a processor coupled to the system logic,
wherein the bus supports the transfer of a vendor-defined message, and the query transaction is a vendor-defined query message transmitted across the bus, and further wherein the second configuration logic receives a version number within the query message from the first configuration logic that the second configuration logic analyzes to determine whether to respond to the query message.

18. An electronic device comprising:
a bus;
a device coupled to the bus having a first configuration logic to carry out a query transaction on the bus to query for the availability of a hardware feature;
a system logic having the hardware feature, and having a second configuration logic to receive the query transaction and to selectively respond with an indication of availability of the hardware feature; and
a processor coupled to the system logic,
wherein the bus supports the transfer of a vendor-defined message, and the query transaction is a vendor-defined query message transmitted across the bus, and further wherein the first configuration logic transmits a code identifying a vendor within the query message from the first configuration logic that the second configuration logic analyzes to determine whether to respond to the query message.

19. An electronic device comprising:
a bus;
a device coupled to the bus having a first configuration logic to carry out a query transaction on the bus to query for the availability of a hardware feature;
a system logic having the hardware feature, and having a second configuration logic to receive the query transaction and to selectively respond with an indication of availability of the hardware feature; and
a processor coupled to the system logic, wherein the bus supports the transfer of a vendor-defined message, and the second configuration logic responds to the query transaction with a is a vendor-defined reply message transmitted across the bus, and further wherein the second configuration logic transmits a version number within the reply message indicating a version of the hardware feature that the system logic possesses.

20. The electronic system of claim 19, wherein the bus is a point-to-point bus having at least one serial data link across which the reply message is transferred in packetized form.

21. The electronic system of claim 19, wherein the bus is one of a plurality of buses organized into a branching tree-like structure with the system logic at the base tree and designated as the root complex.

22. The electronic system of claim 21, wherein the system logic is coupled to the bus, the bus supports the transfer of a message as the query transaction to query for the hardware feature, and the message is directed to the system logic through an indication provided in the message that the message is directed to the device on the other end of whichever bus is coupled to the device that leads towards the root complex.

23. The electronic system of claim 21, wherein the bus supports the transfer of a message as the query transaction to query for the hardware feature, and the message is directed to the system logic through an indication provided in the message that the message is directed to a device at the root complex.

24. An electronic device comprising:
a bus;
a device coupled to the bus having a first configuration logic to carry out a query transaction on the bus to query for the availability of a hardware feature;
a system logic having the hardware feature, and having a second configuration logic to receive the query transaction and to selectively respond with an indication of availability of the hardware feature; and
a processor coupled to the system logic, wherein the bus supports the transfer of a vendor-defined message, and the second configuration logic responds to the query transaction with a is a vendor-defined reply message transmitted across the bus, and further wherein the first configuration logic receives a version number within the reply message from the second configuration logic that the first configuration logic analyzes to determine whether to interact with the hardware feature.

25. A method comprising:
transmitting a query message by logic within a first device across a bus to a second device to query for the availability of a hardware feature within the second device;
receiving the query message by logic within the second device;
selectively responding by the logic within the second device to the query message by transmitting a reply message providing an indication of availability of the hardware feature within the second device;
transmitting a version number within the query message indicating a version of the hardware feature that the first device seeks to interact with; and
analyzing by the logic within second device of the version number transmitted within the query message to determine whether to transmit the reply message in response.

26. A method comprising:
transmitting a query message by logic within a first device across a bus to a second device to query for the availability of a hardware feature within the second device;
receiving the query message by logic within the second device;
selectively responding by the logic within the second device to the query message by transmitting a reply message providing an indication of availability of the hardware feature within the second device;
transmitting a code identifying a vendor within the query message indicating a version of the hardware feature that the first device seeks to interact with; and
analyzing by the logic within the second device of the code identifying the vendor transmitted within the query message to determine whether to transmit the reply message in response.

27. A method comprising:
transmitting a query message by logic within a first device across a bus to a second device to query for the availability of a hardware feature within the second device;
receiving the query message by logic within the second device;
selectively responding by the logic within the second device to the query message by transmitting a reply message providing an indication of availability of the hardware feature within the second device;
transmitting a version number within the reply message indicating a version of the hardware feature possessed by the second device; and
analyzing by the logic within the first device of the version number transmitted within the reply message to determine whether to interact with the hardware feature.

28. The method of claim 27, further comprising arbitrating by the logic within the first device to gain an opportunity to interact with the hardware feature within the second device if the determination is made to interact with the hardware feature.

* * * * *